(12) United States Patent
Misumi et al.

(10) Patent No.: US 7,976,806 B2
(45) Date of Patent: Jul. 12, 2011

(54) GRANULAR MATERIAL COMPRISING POROUS PARTICLES CONTAINING CALCIUM AND/OR MAGNESIUM

(75) Inventors: Osamu Misumi, Chiba (JP); Shinichi Yamamoto, Yamaguchi (JP); Takayuki Watanabe, Chiba (JP); Takashi Kishimoto, Chiba (JP); Takashi Watanabe, Chiba (JP); Fumio Okada, Chiba (JP); Yoshio Ishihara, Tokyo (JP); Katsumasa Suzuki, Tokyo (JP); Kaoru Sakoda, Tokyo (JP)

(73) Assignees: Ube Material Industries, Ltd., Ube-shi, Yamaguchi (JP); Taiyo Nippon Sanso Corporation, Shinagawa-ku, Tokyo (JP)

( * ) Notice: Subject to any disclaimer, the term of this patent is extended or adjusted under 35 U.S.C. 154(b) by 458 days.

(21) Appl. No.: 11/910,126

(22) PCT Filed: Mar. 30, 2006

(86) PCT No.: PCT/JP2006/306749
§ 371 (c)(1),
(2), (4) Date: Nov. 26, 2008

(87) PCT Pub. No.: WO2006/106878
PCT Pub. Date: Oct. 12, 2006

(65) Prior Publication Data
US 2009/0215616 A1    Aug. 27, 2009

(30) Foreign Application Priority Data
Mar. 30, 2005  (JP) .................... 2005-099767

(51) Int. Cl.
*B01J 20/04* (2006.01)
*C01F 11/02* (2006.01)
*B01D 53/68* (2006.01)

(52) U.S. Cl. ............... 423/240 R; 423/594.16; 423/635; 423/640; 502/400

(58) Field of Classification Search ............ 423/594.16, 423/635–640, 240 R; 502/340, 400
See application file for complete search history.

(56) References Cited

U.S. PATENT DOCUMENTS

| 5,492,685 A * | 2/1996 | Moran et al. ............. 423/244.07 |
| 5,705,141 A * | 1/1998 | Dumont et al. ............. 423/640 |
| 2007/0160512 A1* | 7/2007 | Ohmi et al. ............. 422/186.03 |

FOREIGN PATENT DOCUMENTS

JP        03-047533        2/1991
(Continued)

OTHER PUBLICATIONS

English Translation of International Preliminary Report on Patentability and Written Opinion of the International Searching Authority mailed Oct. 11, 2007 for International Application No. PCT/JP2006/306749 filed Mar. 30, 2006.
International Search Report mailed May 2, 2006 for International Application No. PCT/JP2006/306749 filed Mar. 30, 2006.

*Primary Examiner* — Stuart Hendrickson
*Assistant Examiner* — Syed Iqbal
(74) *Attorney, Agent, or Firm* — Nixon Peabody LLP; Jeffrey L. Costellia

(57) ABSTRACT

A granular material having a high strength and a large BET specific surface area composed of porous particles comprising calcium oxide and calcium hydroxide wherein the calcium oxide is contained in an amount of 30 to 80 weight % based on a total amount of the calcium oxide and calcium hydroxide and the porous particles have a BET specific surface area of 40 m$^2$/g or more, or composed of porous particles comprising calcium oxide, magnesium oxide, calcium hydroxide, and magnesium hydroxide wherein a ratio of an amount of magnesium to a total of an amount of calcium and an amount of magnesium is in the range of 0.05 to 0.80, a total hydroxide content in the whole particles is in the range of 1 to 20 weight % and the porous particles have a BET specific surface area of 50 m$^2$/g or more.

20 Claims, 13 Drawing Sheets

FOREIGN PATENT DOCUMENTS

| | | |
|---|---|---|
| JP | 05-058754 | 3/1993 |
| JP | 06-009215 | 1/1994 |
| JP | 2000-070669 | 3/2000 |
| JP | 2002224565 A * | 8/2002 |

* cited by examiner

GRANULAR MATERIAL COMPRISING POROUS PARTICLES CONTAINING CALCIUM AND/OR MAGNESIUM

FIELD OF THE INVENTION

The present invention relates to a granular material comprising porous particles containing calcium oxide or porous particles containing calcium oxide and magnesium oxide, which are of value as a moisture adsorbing material and a material for adsorbing acidic gases and decomposition products of halogenated hydrocarbon gases.

BACKGROUND OF THE INVENTION

The calcium oxide and magnesium oxide are very reactive to water, and hence are utilized as moisture adsorbing materials. Further, both of the calcium oxide and magnesium oxide are basic oxides and very reactive to acids, and hence are utilized as materials for (chemically) adsorbing acidic gases such as a hydrogen fluoride gas, a hydrogen chloride gas, a sulfur dioxide gas and a carbon dioxide gas. Furthermore, studies have been made recently on the calcium oxide and magnesium oxide for utilizing them as materials for adsorbing decomposition products of halogenated hydrocarbon gases, such as, a fluorocarbon gas which is used in a process for manufacture of semiconductor materials, and a halogen gas which is employed as fire extinguisher material.

Japanese Patent Provisional Publication 7-149580 A describes highly active porous calcium oxide granules having high reactivity to a carbon dioxide gas, which are porous calcium oxide granules obtained by calcining granules of calcium hydroxide or calcium carbonate having a specific surface area of at least 5 $m^2/g$ and a particle size of at least 1 mm. This publication describes that the highly active porous calcium oxide granules are produced by calcining granules of calcium hydroxide powder having a size of 300 μm or less at an increasing temperature from 390 to 480° C. for at least 5 minutes, or by calcining granules of calcium carbonate powder having a size of 300 μm or less at an increasing temperature from 700 to 780° C. for at least 5 minutes.

Japanese Patent Provisional Publication 2002-224565 A proposes a material for decomposing a fluorocarbon gas which comprises a granular catalyst (aluminum oxide) for decomposing a fluorocarbon gas and granules of alkaline earth metal oxide such as calcium oxide or magnesium oxide. This publication describes that the fluorocarbon gas-decomposing material is regenerated to give aluminum oxide by reacting aluminum fluoride produced by the reaction of the fluorocarbon gas with aluminum oxide with an alkaline earth metal oxide, and that hence the fluorocarbon gas can be decomposed continuously for a long period of time. In the working examples of this publication, the granules of alkaline earth metal oxide are produced by molding powdery alkaline earth metal oxide under pressure.

"Effects of Composition of Solid Adsorbing Material on Adsorption of Halon Decomposition Gas" by TAKEUCHI, Akihiro, et al., Journal of the Society of Inorganic Materials, Japan, 12, 97-105 (2005) reports that when a halogenated hydrocarbon gas (Halon 1301 gas) is brought into contact with calcium oxide, magnesium oxide, or a mixture of calcium oxide and magnesium oxide at approx. 900° C. (1173K), a decomposition product (fluorine, bromine) of the halogenated hydrocarbon gas is more highly adsorbed by the mixture of calcium oxide and magnesium oxide than by calcium oxide or magnesium oxide alone. In this publication, the mixture of calcium oxide and magnesium oxide is produced by kneading a mixture of calcium hydroxide and magnesium hydroxide in a pure water, molding the kneaded product, and calcining the molded product at approx. 1,000° C. (1273K) in an electric furnace.

It is preferred that a granular material comprising calcium oxide or a granular material comprising calcium oxide and magnesium oxide to be employed as a moisture adsorbing material or a material for adsorbing gases such as an acidic gas or a decomposition product of a halogenated hydrocarbon gas has a large contact surface area (i.e., BET specific surface area) with a gas to be absorbed. Further, it is preferred that the granular gas-adsorbing material has high resistance to physical shock and shows excellent form retention. The reasons are as follows. The granular gas-adsorbing material is generally charged in a gas-processing apparatus such as a column. If the granular gas-adsorbing material powders (is broken down) in the course of the adsorbing material-charging procedure or in the course of the gas-adsorbing operation (in the time when a gas is brought into contact with the gas adsorbing material), the pressure loss in the gas-processing apparatus increases.

SUMMARY OF THE INVENTION

Accordingly, it is the object of the present invention to provide a granular material of calcium oxide or a granular material of calcium oxide and magnesium oxide which has a large BET specific surface area and shows high resistance when it is subjected to physical shock.

The present invention resides in a granular material comprising porous particles which contains calcium oxide and calcium hydroxide wherein the calcium oxide is contained in an amount of 30 to 80 weight % based on a total amount of the calcium oxide and calcium hydroxide, and which has a BET specific surface area of 40 $m^2/g$ or more. In this specification, the granular material comprising porous particles containing calcium oxide and calcium hydroxide may be described as "calcium oxide-containing granular material".

Preferred embodiments of the above-mentioned calcium oxide-containing granular material are described below.

(1) A specific surface area of whole micropores having particle sizes of 2 to 9 nm is in the range of 20 to 100 $m^2/g$, in which the specific surface area is determined by the known BJH method.

(2) A specific surface area of whole micropores having particle sizes of 2 to 9 nm is in the range of 20 to 100 $m^2/g$, and a volume of whole micropores having particle sizes of 10 to 100 nm is in the range of 0.1 to 0.6 mL/g, in which the specific surface area is determined by the BJH method.

(3) The total amount of the calcium oxide and calcium hydroxide is 85 weight % or more, based on the amount of the granular material.

(4) The granular material contains particles having a particle size of 1 mm or less in an amount of less than 5 wt. % and contains particles having a particle size of 10 mm or more in an amount of less than 5 wt. %.

The invention also resides in a method for producing the above-mentioned granular material which comprises calcining a granular material comprising porous calcium hydroxide particles having a BET specific surface area of 10 $m^2/g$ or more at a temperature of 315 to 500° C. and a pressure of 300 Pa or less, until the amount of the porous particles decreases by 8.8-20 weight % based on the amount of the calcium hydroxide of the latter granular material.

The invention further resides in a granular material comprising porous particles containing calcium oxide, magnesium oxide, calcium hydroxide and magnesium hydroxide wherein a ratio of an amount of magnesium to a total of an amount of calcium and an amount of magnesium is in the range of 0.05 to 0.80, a total hydroxide content in the whole particles is in the range of 1 to 20 weight %, and having a BET specific surface area of 50 m$^2$/g or more. In this specification, the granular material comprising porous particles containing calcium oxide, magnesium oxide, calcium hydroxide and magnesium hydroxide may be described as "calcium oxide/magnesium oxide-containing granular material".

Preferred embodiments of the above-mentioned calcium oxide/magnesium oxide-containing granular material are described below.

(1) A specific surface area of whole micropores having particle sizes of 2 to 9 nm is in the range of 40 to 200 m$^2$/g, in which the specific surface area is determined by the BJH method.

(2) A specific surface area of whole micropores having particle sizes of less than 2 nm is in the range of 20 to 200 m$^2$/g, in which the specific surface area is determined by the BJH method.

(3) A specific surface area of whole micropores having particle sizes of less than 2 nm is in the range of 20 to 200 m$^2$/g, a specific surface area of whole micropores having particle sizes of 2 to 9 nm is in the range of 40 to 200 m$^2$/g, and a volume of whole micropores having particle sizes of 10 to 100 nm is in the range of 0.1 to 0.6 mL/g, in which the specific surface area is determined by the BJH method.

(4) The total amount of the calcium and magnesium is 50 weight % or more, based on the amount of the granular material.

(5) The granular material contains particles having a particle size of 1 mm or less in an amount of less than 5 wt. % and contains particles having a particle size of 10 mm or more in an amount of less than 5 wt. %.

The invention furthermore resides in a method for producing the above-mentioned granular material which comprises calcining a granular material comprising porous calcium hydroxide particles having a BET specific surface area of 10 m$^2$/g or more and porous magnesium hydroxide particles having a BET specific surface area of 10 m$^2$/g or more in which a ratio of the amount of magnesium to a total of the amount of calcium and the amount of magnesium is in the range of 0.05 to 0.80, at a temperature of 315 to 500° C. and a pressure of 300 Pa or less.

The granular material of the invention which comprises calcium oxide and calcium hydroxide shows a high strength and excellent form retention, while it has such a large BET specific surface area as 40 m$^2$/g or more.

Thus, the granular material of the invention shows a high gas adsorption capacity and is well resistant to powderization, and hence is favorably employable as a gas adsorbing material to be charged in a gas processing apparatus. The method of the invention enables to industrially produce the granular material comprising calcium oxide and calcium hydroxide, which has a large BET specific surface area and shows a high strength and excellent form retention.

The granular material of the invention which comprises calcium oxide, magnesium oxide, calcium hydroxide and magnesium hydroxide shows a high strength and excellent form retention, while it has such a large BET specific surface area as 50 m$^2$/g or more. Thus, the granular material of the invention shows a high gas adsorption capacity and is well resistant to powderization, and hence is favorably employable as a gas adsorbing material to be charged in a gas processing apparatus. The method of the invention enables to industrially produce the granular material comprising calcium oxide, magnesium oxide, calcium hydroxide and magnesium hydroxide, which has a large BET specific surface area and shows a high strength and excellent form retention.

PREFERRED EMBODIMENTS OF THE INVENTION

The calcium oxide-containing granular material comprises porous particles comprising calcium oxide and calcium hydroxide wherein the calcium oxide is contained in an amount of 30 to 80 weight % based on a total amount of the calcium oxide and calcium hydroxide, and has a BET specific surface area of 40 m$^2$/g or more.

The porous particles are composed of calcium oxide micro-particles, calcium hydroxide micro-particles, and micro-particles comprising calcium oxide and calcium hydroxide, which are aggregated or bonded together.

A ratio of the amount of calcium oxide to a total of the amount of calcium oxide and the amount of calcium hydroxide, that is, $100 \times CaO/(Ca(OH)_2+CaO)$, is in the range of 30 to 80 wt. %, preferably in the range of 40 to 70 wt. %, more preferably in the range of 40 to 60 wt. %. It has been found that the form retention of the granular material lowers when the amount of calcium oxide exceeds the above-mentioned range. On the other hand, the BET specific surface area decreases when the amount of calcium oxide is lower than the above-mentioned range.

The BET specific surface area is not less than 40 m$^2$/g, preferably in the range of 60 to 100 m$^2$/g. In the invention, the BET specific surface area is a value determined using a nitrogen gas.

The calcium oxide-containing granular material may contain other calcium compounds (e.g., calcium carbonate) than calcium oxide and calcium hydroxide. However, it is preferred that a total of the amount of calcium oxide and the amount of calcium hydroxide is not less than 85 wt. %, more preferably not less than 90 wt. %, based on the amount of the granular material.

The granular material of the invention containing calcium oxide preferably shows a micropore size distribution curve (which is obtained by the BJH method from a desorption isothermal curve determined using a nitrogen gas) in which there are observed two peaks each corresponding to micropores having pore sizes of 2 to 9 nm and micropores having pore sizes of 10 to 100 nm. In more detail, it is preferred that there are observed at least one peak within each of the micropore size range of 2 to 9 nm and the micropore size range of 10 to 100 nm in a micropore size distribution curve Ds (log d) in relation to the specific surface area which is obtained by the BJH method.

In the invention, the micropore size means a diameter of the micropore.

The micropores having pore sizes of 2 to 9 nm are micropores formed on surfaces of the micro particles which constitute the granular material. Accordingly, when the specific surface area of the whole micropores having pore sizes of 2 to 9 nm increases, the micro particles constituting the granular material show an increased gas adsorption capacity. The specific surface area of the whole micropores having pore sizes of 2 to 9 nm which is obtained by the BJH method is preferably in the range of 20 to 100 m$^2$/g, more preferably in the range of 30 to 75 m$^2$/g.

The micropores having pore sizes of 10 to 100 nm are micropores formed between the adjoining micro particles which constitute the granular material. Accordingly, when the volume of the whole micropores having pore sizes of 10 to 100 nm increases, a gas under processing easily enters the space between the adjoining micro particles constituting the granular material and the granular material shows an increased gas adsorption capacity. The volume of the whole micropores having pore sizes of 10 to 100 nm which is obtained by the BJH method is preferably in the range of 0.1 to 0.6 mL/g, more preferably in the range of 0.2 to 0.5 mL/g, most preferably in the range of 0.35 to 0.5 mL/g.

The calcium oxide-containing granular material of the invention can be favorably produced in industry by a method which comprises calcining a granular material comprising porous calcium hydroxide particles having a BET specific surface area of 10 $m^2$/g or more, generally at a temperature of 315 to 500° C. and a pressure of 300 Pa or less, until the amount of the porous particles decreases by 8.8-20 wt. % based on the amount of the calcium hydroxide of the latter granular material.

The granular material comprising porous calcium hydroxide particles are granules formed by aggregation or bonding of a calcium hydroxide powder. The porous calcium hydroxide granules preferably have a BET specific surface area in the range of 40 to 60 $m^2$/g.

The porous calcium hydroxide granules can be produced by a process comprising the steps of adding water to a calcium hydroxide powder and granulating the wet powder, that is, a wet granulation process. The water to be added to the calcium hydroxide can contain 0.5 to 5 wt. % of a water-soluble organic binder material such as carboxymethylcellulose or polyvinyl alcohol so as to enhance the form retention of the resulting porous calcium hydroxide granules.

The calcium hydroxide powder can be produced by mixing a calcium oxide powder with water so that the calcium oxide powder is hydrated. The water to be used for the hydration of the calcium oxide powder can contain 1.0 to 10 wt. % of a known reaction retardant such as diethylene glycol or sorbitol. It is preferred that at least 50 wt. %, more preferably at least 70 wt. %, of the calcium oxide powder to be used for the production of the calcium hydroxide powder passes through a sieve having openings of 74 μm size (200 mesh sieve).

The calcium hydroxide granules obtained by the wet granulation process contain water. Accordingly, it is preferred that the granules are dried in a dryer until the water content decreases to 1 wt. % or less, and then subjected to the calcination step. The step for drying the water-containing porous calcium hydroxide granules is preferably performed by introducing an inert gas such as a nitrogen gas or an argon gas into the drier or by degassing the drier by means of a vacuum pump so that the calcium hydroxide is not reacted with carbon dioxide in an air and not converted into calcium carbonate. The drying procedure is preferably performed at a temperature of 100 to 250° C., more preferably 150 to 200° C.

Thus produced porous calcium hydroxide granules are preferably sieved in advance of being subjected to the calcination step to give granules having sizes in the range of 1 to 10 mm.

In the method of the invention for producing the granular material comprising porous calcium oxide particles, the calcium hydroxide powder is calcined at a temperature of generally in the range of 315 to 500° C., more preferably 350 to 450° C. and a pressure of generally not higher than 300 Pa, preferably in the range of 1 to 200 Pa, more preferably in the range of 1 to 150 Pa. The calcination of the calcium hydroxide powder is performed until an amount of the powder decreases by 8.8-20 weight % based on an amount of the calcium hydroxide.

The calcium oxide/magnesium oxide-containing granular material of the invention comprises porous particles comprising calcium oxide, calcium hydroxide, magnesium oxide and magnesium hydroxide in which a ratio of the amount of magnesium to a total of the amount of calcium and the amount of magnesium is in the range of 0.05 to 0.80, a total hydroxide content in the whole particles is in the range of 1 to 20 wt. %, and has a BET specific surface area of 50 $m^2$/g or more.

The porous particles are composed of calcium oxide micro-particles, calcium hydroxide micro-particles, and micro-particles comprising calcium oxide and calcium hydroxide, magnesium micro-particles, magnesium hydroxide micro-particles, and micro-particles comprising magnesium oxide and magnesium hydroxide which are aggregated or bonded together.

A ratio of the amount of magnesium to a total of the amount of calcium and the amount of magnesium, that is, Mg/(Ca+Mg), is in the range of 0.05 to 0.80 It has been found that the BET specific surface area of the granular material decreases when the magnesium content is lower than the above-mentioned range. On the other hand, the strength of the granular material decreases when the magnesium content is higher than the above-mentioned range. The total of the amount of calcium and the amount of magnesium is preferably not less than 50 wt. %, more preferably in the range of 52 to 68 wt. %, based on the amount of the granular material.

The total content of calcium hydroxide and magnesium hydroxide can be in the range of 1 to 20 wt. % in terms of the amount of the whole hydroxyl group (OH). The granular material shows a lower strength when the amount of the whole hydroxyl group is lower the above-mentioned range, while the gas adsorbing capacity decreases due to poor contents of calcium oxide and magnesium oxide when the amount of the whole hydroxyl group is higher than the above-mentioned range.

The BET specific surface area of the granular material is not less than 50 $m^2$/g, preferably is in the range of 60 to 400 $m^2$/g.

The calcium oxide/magnesium oxide-containing granular material may contain a small amount of carbonates such as calcium carbonate and magnesium carbonate. It is preferred that the total content of carbonates is less than 5 wt. %, more preferably less than 3 wt. % in terms of carbon dioxide content.

The calcium oxide/magnesium oxide-containing granular material of the invention preferably shows a micropore size distribution curve (which is obtained by the BJH method from desorption isothermal curve determined using a nitrogen gas) in which there are observed three peaks each corresponding to micropores having pore sizes of less than 2 nm, micropores having pore sizes of 2 to 9 nm and micropores having pore sizes of 10 to 100 nm. In more detail, it is preferred that there are observed at least one peak within each of the micropore size range of 2 to 9 nm and the micropore size range of 10 to 100 nm and one peak in the area of a micropore size of 2 nm (or the curve shows a steep elevation as the pore size decreases from 2 nm) in a micropore size distribution curve Ds (log d) in relation to the specific surface area which is obtained by the BJH method.

The micropores having pore sizes of less than 2 nm are micropores formed on surfaces of the micro particles (particularly, micro particles comprising magnesium oxide) which constitute the granular material. Accordingly, when the specific surface area of the whole micropores having pore sizes of less than 2 nm increases, the micro particles constituting the granular material show an increased gas adsorption capacity. The specific surface area of the whole micropores having pore sizes of less than 2 nm which is obtained by the BJH method is preferably in the range of 20 to 400 $m^2$/g, more preferably in the range of 100 to 200 $m^2$/g.

The micropores having pore sizes of 2 to 9 nm are micropores formed on surfaces of the micro particles (particularly, micro particles comprising calcium oxide) which constitute the granular material. Accordingly, when the specific surface area of the whole micropores having pore sizes of 2 to 9 nm increases, the micro particles constituting the granular material show an increased gas adsorption capacity. The specific surface area of the whole micropores having pore sizes of 2 to 9 nm which is obtained by the BJH method is preferably in the range of 40 to 200 $m^2/g$, more preferably in the range of 60 to 150 $m^2/g$.

The micropores having pore sizes of 10 to 100 nm are micropores formed between the adjoining micro particles which constitute the granular material. Accordingly, when the volume of the whole micropores having pore sizes of 10 to 100 nm increases, a gas to be processed easily enters the space between the adjoining micro particles constituting the granular material and the granular material shows an increased gas adsorption capacity. The volume of the whole micropores having pore sizes of 10 to 100 nm which is obtained by the BJH method is preferably in the range of 0.1 to 0.6 mL/g, more preferably in the range of 0.2 to 0.5 mL/g.

The calcium oxide/magnesium oxide-containing granular material of the invention can be favorably produced in industry by a method which comprises calcining a granular material comprising a mixture of a porous calcium hydroxide powder having a BET specific surface area of 10 $m^2/g$ or more and a porous magnesium hydroxide powder having a BET specific surface area of 10 $m^2/g$ or more in which a ratio of the amount of magnesium to a total of the amount of calcium and the amount of magnesium is in the range of 0.05 to 0.80, generally at a temperature of 315 to 500° C. and a pressure of 300 Pa or less.

The granules comprising a mixture of a porous calcium hydroxide powder and a porous magnesium hydroxide powder can be produced by a process comprising the steps of adding water to a mixture of a calcium hydroxide powder and a magnesium hydroxide powder and granulating the wet mixture, that is, a wet granulation process. Each of the starting hydroxide powders, i.e., a calcium hydroxide powder and a magnesium oxide powder preferably has a BET specific surface area in the range of 20 to 60 $m^2/g$. The water to be added to the mixture can contain 0.5 to 5 wt. % of a water-soluble organic binder material such as carboxymethylcellulose or polyvinyl alcohol so as to enhance the form retention of the resulting porous granules.

The granules obtained by the wet granulation process contain water. Accordingly, it is preferred that the granules are dried in a dryer until the water content decreases to 1 wt. % or less, and then subjected to the calcination step. The step for drying the water-containing porous granules is preferably performed by introducing an inert gas such as a nitrogen gas or an argon gas into the drier or by degassing the drier by means of a vacuum pump so that the calcium hydroxide and magnesium hydroxide are not reacted with carbon dioxide in an air and not converted into calcium carbonate and magnesium carbonate. The drying procedure is preferably performed at a temperature of 100 to 250° C., more preferably 150 to 200° C.

Thus produced porous granules are preferably sieved in advance of being subjected to the calcination step to give granules having sizes in the range of 1 to 10 mm.

In the method of the invention for producing the granular material, the particle mixture is calcined at a temperature of generally in the range of 315 to 500° C., more preferably 330 to 450° C. and a pressure of generally not higher than 300 Pa, preferably in the range of 1 to 200 Pa, more preferably in the range of 1 to 150 Pa. The step for calcining the mixture is performed generally for the period of 30 min. to 2 hours, depending on the calcining temperature and other conditions.

Each of the granular material of the invention containing calcium oxide and the granular material of the invention containing calcium oxide and magnesium oxide can be used as a moisture adsorbing material.

Further, each of the granular material of the invention containing calcium oxide and the granular material of the invention containing calcium oxide and magnesium oxide can be used as a material for adsorbing an acidic gas such as a hydrogen fluoride gas, a hydrogen chloride gas, a sulfur dioxide gas, or a carbon dioxide gas.

Furthermore, each of the granular material of the invention containing calcium oxide and the granular material of the invention containing calcium oxide and magnesium oxide can be used as a material for adsorbing a decomposition gas of a halogenated hydrocarbon gas. The halogenated hydrocarbon gas includes a hydrocarbon gas of which a portion or whole of the hydrogen is replaced with a halogen (particularly fluorine or bromine). Examples of the halogenated hydrocarbon gases include a fluorocarbon gas (including a perfluorocarbon gas) and a halon gas. The decomposition gas of the halogenated hydrocarbon gas can be produced in the known exhaust gas-processing apparatus utilizing the plasma decomposition system.

Moreover, each of the calcium oxide-containing granular material of the invention and the calcium oxide/magnesium oxide-containing granular material of the invention can be used in the form of a mixture with a fluorocarbon decomposition catalyst for decomposing and processing a fluorocarbon gas (including a perfluorocarbon gas). Examples of the fluorocarbon gas decomposition catalysts include aluminum oxide and an alumina catalyst comprising 80% of aluminum oxide and 20% of nickel dioxide ($NiO_2$). The fluorocarbon gas decomposition catalyst preferably decomposes the fluorocarbon gas generally at a temperature of 300 to 1,000° C., particularly 700 to 1000° C. in the presence of moisture. The fluorocarbon gas decomposition catalyst preferably is in the form of a porous granule. In the fluorocarbon gas-decomposing and processing material, the calcium oxide-containing granular material of the invention or the calcium oxide/magnesium oxide-containing granular material of the invention can be used with the fluorocarbon gas decomposing catalyst in a ratio in the range of 10:90 to 90:10 by weight.

Each of the calcium oxide-containing granular material of the invention and the calcium oxide/magnesium oxide-containing granular material of the invention can be adjusted in its granular size depending on its uses. It is preferred that the granular material contains particles having a particle size of 1 mm or less in an amount of less than 5 wt. %, preferably in an amount of less than 1 wt. %, and contains particles having a particle size of 10 mm or more in an amount of less than 5 wt. %, preferably in an amount of less than 1 wt. %, if the granular material is charged in a gas-processing apparatus.

EXAMPLES

Example 1

Granular Material of Porous Particles Containing Calcium Oxide (1) Production of Granules Comprising Porous Calcium Hydroxide Particles A calcined calcium oxide (particle size: 40 to 70 mm) was pulverized to give a calcium oxide powder (75 wt. % of which passed a 200 mesh sieve (opening size: 74 μm)). The obtained calcium oxide powder showed an activity of 205 mL (value determined at a lapse of 5 min.) and an activity of 212 mL (value determined at a lapse of 10 min.). The above-mentioned activity was determined by the following crude particle determination method defined in the referential test methods (edited by Japan Lime Society):

In a 2 L-volume vessel are placed 500 mL of pure water (30° C.) and a small amount of a phenolphthalein indicator. While the aqueous solution is stirred with a stirrer at 350 rpm, accurately 25 g of a calcium oxide powder was incorporated into the stirred solution. The time of incorporation of the calcium oxide powder is recorded. After the incorporation of the calcium oxide powder, a 4N hydrochloric acid was continuously added dropwise from a buret to the stirred aqueous mixture so that the color given by the indicator does not disappear. The amount of the hydrochloric acid added within 5 minutes or 10 minutes from the time of incorporation of the calcium oxide powder corresponds respectively to the activity at a lapse of 5 min. (5 min. activity) and the activity at a lapse of 10 min. (10 min. activity).

9 kg of the calcium oxide powder and 9.73 kg of a slaking water (obtained by dissolving 1.85 wt. % of diethylene glycol in pure water) were placed in a high speed pro-shear mixer (available from Pacific Machine Engineering Co., Ltd., effective volume: 75 L). The powder and water were stirred and mixed for 5 minutes. Subsequently, 3.2 kg of pure water (secondary water) was placed in the mixer. The mixture was then stirred for 5 minutes, to give a water-containing porous calcium hydroxide granules. The porous calcium hydroxide granules had a water content of 30 wt. %.

The porous calcium hydroxide granules were then placed in a shelf-type vacuum dryer and heated at 180° C. under degassing by means of a vacuum pump, until the water content decreases to 1 wt. % or less. Subsequently, thus obtained dry granules were sieved on a vibrating circular sieve to collect porous calcium hydroxide granules having particle sizes in the range of 2.0 to 5.6 mm. Thus collected porous calcium hydroxide granules contained 3.53 wt. % of calcium oxide, 90.42 wt. % of calcium hydroxide, and 2.48 wt. % of calcium carbonate. The BET specific surface area was 49.1 m$^2$/g, and the powderization ratio (value at a lapse of 10 min., 10 min. value) was 0.22 wt. %. The methods for determining the chemical composition, BET specific surface area and powderization ratio are described hereinbelow.

(2) Production of Calcined Products No. 1-1 to 1-8 from Porous Calcium Hydroxide Granules The porous calcium hydroxide granules (particle size: 2.0 to 5.6 mm) obtained in (1) above were placed in an electric vacuum calcining oven. The pressure in the oven was decreased to 50 Pa by means of a vacuum pump, and the temperature in the oven was increased from room temperature to 375° C. at a temperature elevation rate of 1.5° C./min. The calcination was performed maintaining this temperature for a period set forth in the below-given Table 1-1. Subsequently, the atmosphere in the oven was cooled to the take-out temperature set forth in Table 1-1, and the calcined products No. 1-1 to No. 1-8 were obtained. Note that the pressure in the oven was maintained not exceeding 150 Pa by degassing the oven by means of a vacuum pump, and that the take-out of the calcined product was performed after purging the inner atmosphere with a nitrogen gas to reach an atmospheric pressure.

The sizes of the calcined products No. 1-1 to No. 1-8 were almost the same as those of the starting porous calcium hydroxide granules. The calcined product contained particles having a particle size of 1 mm or less in an amount of less than 0.1 wt. % and which contains particles having a particle size of 10 mm or more in an amount of less than 0.1 wt. %.

TABLE 1-1

| | Calcining period | Take-out temp. |
|---|---|---|
| Calcined product No. 1-1 | 0 min. | 375° C. |
| Calcined product No. 1-2 | 0 min. | 250° C. |
| Calcined product No. 1-3 | 15 min. | 250° C. |
| Calcined product No. 1-4 | 1 hr. | 250° C. |
| Calcined product No. 1-5 | 1 hr. & 20 min. | 250° C. |
| Calcined product No. 1-6 | 2 hrs. | 250° C. |
| Calcined product No. 1-7 | 3 hrs. & 30 min. | 250° C. |
| Calcined product No. 1-8 | 8 hrs. | 250° C. |

(3) Evaluations and Results

The calcined products produced from the porous calcium hydroxide granules were determined with respect to the composition (the content of calcium oxide, the content of calcium hydroxide, and the content of calcium carbonate), BET specific surface area and powderization ratio by the below-described methods. The results of determination of the chemical composition are set forth in Table 1-2, and the BET specific surface area and powderization ratio (value at a lapse of 10 minutes, 10 min.-value) are set forth in Table 1-3.

[Determinations of Chemical Composition]

The whole amount of calcium oxide, the amount of the contained water, the ignition loss, the amount of carbon dioxide, and the whole amount of carbon dioxide are determined by the below-described methods. Then, the contents of calcium oxide (CaO), calcium hydroxide (Ca(OH)$_2$) and calcium carbonate (CaCO$_3$) are calculated using the below-mentioned equations (1) to (3).

Amount of whole calcium oxide (wt. %): determined according to JIS-R-9011 (1933) "Chemical Analysis of Lime, 6.7.1 (Quantitative Analysis of Calcium Oxide)".

Amount of contained water (wt. %): determined by means of a Kett moisture content meter.

Ignition loss (wt. %): determined according to JIS-R-9011 (1933) "Chemical Analysis of Lime, 6.1 (Quantitative Analysis of Ignition Loss)".

Amount of carbon dioxide (wt. %): determined according to JIS-R-9011 (1933) "Chemical Analysis of Lime, 6.11 (Quantitative Analysis of Carbon Dioxide)".

Amount of whole carbon dioxide (wt. %): determined by means of CARBON/SULFUR-ANALYZER EMIA-820 (available from Horiba Seisakusho Co., Ltd.). The sample is heated to 1,250° C. in an oxygen stream, and the amounts of the produced carbon dioxide and the produced carbon monoxide are determined using an IR spectrum. The amount of whole carbon dioxide corresponds to a total of the determined carbon dioxide amount and an amount converted from the determined carbon monoxide amount.

$$\begin{aligned}\text{Calcium oxide content (wt. \%)} = &\text{Amount of whole}\\ &\text{calcium oxide} - \text{Amount of calcium hydroxide} \times\\ &\text{(Molecular weight of calcium oxide/Molecular}\\ &\text{weight of calcium hydroxide)} - \text{Amount of calcium carbonate} \times \text{(Molecular weight of calcium}\\ &\text{oxide/Molecular weight of calcium carbonate}\end{aligned} \quad (1)$$

$$\begin{aligned}\text{Calcium hydroxide content (wt. \%)} = &(\text{Ignition loss} -\\ &\text{Amount of contained water} - \text{Amount of whole}\\ &\text{carbon dioxide}) \times (\text{Molecular weight of calcium}\\ &\text{hydroxide/Molecular weight of water})\end{aligned} \quad (2)$$

$$\begin{aligned}\text{Calcium carbonate content (wt. \%)} = &\text{Amount of carbon dioxide} \times (\text{Molecular weight of calcium carbonate/Molecular weight of carbon dioxide})\end{aligned} \quad (3)$$

[Measurement of BET Specific Surface Area]

A sample in an amount of 0.2 to 0.3 g is measured according to the BET 5-points measurement method using an automatic gas adsorption-measuring apparatus (AUTOSORB-3B, available from Quantachrome Co., Ltd.). If the water contained in the sample is 0.2 wt. % or more, the sample is dried at 200° C. for one hour by degassing by means of a vacuum pump.

[Determination of Powderization Ratio]

60 g of a sample is accurately weighed and placed on a standard circular sieve (diameter: 75 mm, openings: 250 μm). The circular sieve is vibrated for 10 minutes with an amplitude of 1 mm by means of an electromagnetic vibrator (A-3PRO, available from FRITSH Co., Ltd.). After 10 minutes, the amount of sample having passed through the sieve is measured. The powderization ratio (10 min.-value) is calculated using the below-mentioned equation. A series of the procedures for the determination of the powderization ratio are performed in a globe box (at 25° C., 3% RH or less) which have been purged with a nitrogen gas, so that the weight change caused by moisture and carbon dioxide does not occur in the procedures of the determination.

Powderization ratio (wt. %, 10 min.-value)=(Amount of the sample having passed through the sieve (g))/60 (g)×100

TABLE 1-2

|  | CaO (wt. %) | Ca(OH)$_2$ (wt. %) | CaCO$_3$ (wt. %) | CaO/(Ca(OH)$_2$ + CaO) (wt. %) |
| --- | --- | --- | --- | --- |
| Porous Ca(OH)$_2$ granules | 3.53 | 90.42 | 2.48 | 3.76 |
| Calcined product | | | | |
| No. 1-1 | 19.76 | 72.39 | 5.94 | 21.44 |
| No. 1-2 | 40.75 | 51.36 | 4.66 | 44.24 |
| No. 1-3 | 43.22 | 48.56 | 4.89 | 47.09 |
| No. 1-4 | 53.95 | 37.16 | 4.80 | 59.21 |
| No. 1-5 | 58.44 | 31.85 | 5.05 | 64.72 |
| No. 1-6 | 79.76 | 10.95 | 4.23 | 87.93 |
| No. 1-7 | 86.10 | 4.32 | 4.98 | 95.22 |
| No. 1-8 | 87.23 | 3.66 | 5.09 | 95.97 |

TABLE 1-3

|  | BET specific surface area (m$^2$/g) | Powderization ratio (10 min.-value, wt. %) |
| --- | --- | --- |
| Porous Ca(OH)$_2$ granules | 49.1 | 0.22 |
| Calcined product | | |
| No. 1-1 | 45.2 | 0.26 |
| No. 1-2 | 67.9 | 0.28 |
| No. 1-3 | 67.4 | 0.25 |
| No. 1-4 | 67.4 | 0.35 |
| No. 1-5 | 71.5 | 0.53 |
| No. 1-6 | 71.1 | 1.01 |
| No. 1-7 | 73.3 | 0.93 |
| No. 1-8 | 73.3 | 0.97 |

FIG. 1 shows a relationship between a ratio of the amount of calcium oxide to a total of the amount of calcium oxide and calcium hydroxide or a calcined product thereof, that is, 100× CaO/(Ca(OH)$_2$+CaO) and a BET specific surface area or a powderization ratio (value at a lapse of 10 min.) thereof.

From the results shown in FIG. 1, it is understood that the calcined products of the porous calcium hydroxide granules which contains 30 to 80 wt. % of calcium oxide have a large BET specific surface area and show a low powderization ratio.

Example 2

Granules of Porous Particles Comprising Calcium Oxide, Calcium Hydroxide, Magnesium Oxide and Magnesium Hydroxide (1) Production of Powder Mixture Granules A to G A calcium hydroxide powder (Ca(OH)$_2$: purity not lower than 90 wt. %, BET specific surface area: 45.5 m$^2$/g, available from UBE MATERIAL INDUSTRIES, LTD.) and a magnesium hydroxide powder (Mg(OH)$_2$: purity not lower than 90 wt. %, BET specific surface area: 25.5 m$^2$/g, available from UBE MATERIAL INDUSTRIES, LTD.) were mixed in a ratio set forth in the below-given Table 2-1. The mixture was further mixed with water to give a uniform mixture. The resulting aqueous mixture was processed to give an aqueous cylindrical granular product (diameter: 3 mm) by means of an extruder. The aqueous cylindrical granular product was placed in a shelf-type vacuum dryer. Then, the granular product was dried at a temperature of 150° C. and a pressure of not higher than 50 Pa, until the water content decreases to 1 wt. % or lower. Subsequently, the dry granular product was sieved on a vibrating circular sieve to give a Powder mixture granules A to G.

TABLE 2-1

|  | Wight ratio of starting powders Ca(OH)$_2$:Mg(OH)$_2$ |
| --- | --- |
| Powder mixture granule A | 100:0 |
| Powder mixture granule B | 90:10 |
| Powder mixture granule C | 75:25 |
| Powder mixture granule D | 50:50 |
| Powder mixture granule E | 25:75 |
| Powder mixture granule F | 5:90 |
| Powder mixture granule G | 0:100 |

(2) Production of Calcined Products No. 2-1 to No. 2-7

The powder mixture granules A to G obtained in (1) above were placed in an electric vacuum calcining oven. The pressure in the oven was decreased to 50 Pa by means of a vacuum pump, and the temperature in the oven was increased from room temperature (approx. 25° C.) to 350° C. at a temperature elevation rate of 1.5° C./min. The calcination of the powder mixture granules was performed maintaining this temperature for one hour, to give Calcined products No. 2-1 to No. 2-7. After the calcination, the atmosphere in the oven was cooled to 200° C., and the calcined products were taken out.

The sizes of the calcined products were almost the same as those of the starting powder mixture granules. The calcined product contained particles having a particle size of 1 mm or less in an amount of less than 1 wt. % and which contains particles having a particle size of 10 mm or more in an amount of less than 1 wt. %. For Calcined products No. 2-1 to No. 2-7, X-ray diffraction patterns were obtained. It was confirmed that the X-ray diffraction patterns contained X-ray diffraction peaks corresponding to all of calcium oxide, magnesium oxide, calcium hydroxide and magnesium hydroxide.

Table 2-2 indicates that powder mixture granules used for the production of Calcined products No. 2-1 to No. 2-7, the inner pressure adopted in the calcining procedure, the calcining temperature, the calcining period, and the temperature at which the calcined product was taken out from the oven.

(3) Production of Calcined Products No. 2-8 to No. 2-14

The procedures employed in (2) above for the production of Calcined products No. 2-1 to No. 2-7 were repeated to give Calcined products No. 2-8 to No. 2-14.

The sizes of the calcined products were almost the same as those of the starting powder mixture granules. The calcined product contained particles having a particle size of 1 mm or less in an amount of less than 1 wt. % and which contains particles having a particle size of 10 mm or more in an amount of less than 1 wt. %. For Calcined products No. 2-8 to No. 2-14, X-ray diffraction patterns were obtained. It is confirmed that the X-ray diffraction patterns contained X-ray diffraction peaks corresponding to all of calcium oxide, magnesium oxide, calcium hydroxide and magnesium hydroxide.

Table 2-2 indicates that powder mixture granules used for the production of Calcined products No. 2-8 to No. 2-14, the inner pressure adopted in the calcining procedure, the calcining temperature, the calcining period, and the temperature at which the calcined product was taken out from the oven.

(4) Production of Calcined Products No. 2-15 to No. 2-21

10 g of each of Powder mixture granules A to G was placed in a box-type electric oven. The temperature in the oven was increased from room temperature (approx. 25° C.) to 1000° C. at a temperature elevation rate of 5.0° C./min. Subsequently, the calcining procedure was performed for one hour by maintaining that temperature, to give Calcined product No. 2-15 to No. 2-21. The calcined product was cooled in the oven until the inner temperature of the oven lowered to 600° C. Then, the calcined product was taken out.

The sizes of the calcined products were almost the same as those of the starting powder mixture granules. The calcined product contained particles having a particle size of 1 mm or less in an amount of less than 1 wt. % and which contains particles having a particle size of 10 mm or more in an amount of less than 1 wt. %.

Table 2-2 indicates that powder mixture granules used for the production of Calcined products No. 2-15 to No. 2-21, the inner pressure adopted in the calcining procedure, the calcining temperature, the calcining period, and the temperature at which the calcined product was taken out from the oven.

TABLE 2-2

| Calcined product | Mixture granule | Calcining pressure | Calcining temp. | Calcining period | Take-out temp. |
|---|---|---|---|---|---|
| No. 2-1 | A | ≦150 Pa | 350° C. | 1 hr. | 200° C. |
| No. 2-2 | B | ≦150 Pa | 350° C. | 1 hr. | 200° C. |
| No. 2-3 | C | ≦150 Pa | 350° C. | 1 hr. | 200° C. |
| No. 2-4 | D | ≦150 Pa | 350° C. | 1 hr. | 200° C. |
| No. 2-5 | E | ≦150 Pa | 350° C. | 1 hr. | 200° C. |
| No. 2-6 | F | ≦150 Pa | 350° C. | 1 hr. | 200° C. |
| No. 2-7 | G | ≦150 Pa | 350° C. | 1 hr. | 200° C. |
| No. 2-8 | A | ≦150 Pa | 400° C. | 1 hr. | 200° C. |
| No. 2-9 | B | ≦150 Pa | 400° C. | 1 hr. | 200° C. |
| No. 2-10 | C | ≦150 Pa | 400° C. | 1 hr. | 200° C. |
| No. 2-11 | D | ≦150 Pa | 400° C. | 1 hr. | 200° C. |
| No. 2-12 | E | ≦150 Pa | 400° C. | 1 hr. | 200° C. |
| No. 2-13 | F | ≦150 Pa | 400° C. | 1 hr. | 200° C. |
| No. 2-14 | G | ≦150 Pa | 400° C. | 1 hr. | 200° C. |
| No. 2-15 | A | atmospheric | 1000° C. | 1 hr. | 600° C. |
| No. 2-16 | B | atmospheric | 1000° C. | 1 hr. | 600° C. |
| No. 2-17 | C | atmospheric | 1000° C. | 1 hr. | 600° C. |
| No. 2-18 | D | atmospheric | 1000° C. | 1 hr. | 600° C. |
| No. 2-19 | E | atmospheric | 1000° C. | 1 hr. | 600° C. |
| No. 2-20 | F | atmospheric | 1000° C. | 1 hr. | 600° C. |
| No. 2-21 | G | atmospheric | 1000° C. | 1 hr. | 600° C. |

For Calcined products No. 2-1 through No. 21, the calcium (Ca) content, magnesium content (Mg), whole hydroxyl group (OH) content, carbon dioxide ($CO_2$) content, BET specific surface area, and resistance to deformation under load were determined by the below-stated methods.

The Ca content, Mg content, a weight ratio of the magnesium content to a total of the calcium content and magnesium content [Mg/(Ca+Mg)] are set forth in Table 2-3. The BET specific surface area and resistance to deformation under load are set forth in Table 2-4.

1) Determination of Ca Content

The whole calcium oxide content is determined according to JIS-R-9011 (1933) "Chemical Analysis of Lime, 6.7.1 (Quantitative Analysis of Calcium Oxide)", and the Ca content is calculated using the following equation:

Ca content (wt. %)=Whole calcium oxide content (wt. %)×[(Atomic weight of calcium)/(Molecular weight of calcium oxide]

2) Determination of Mg Content

The magnesium oxide content is determined according to JIS-R-9011 (1933) "Chemical Analysis of Lime, 6.8 (Quantitative Analysis of Magnesium Oxide)", and the Mg content is calculated using the following equation:

Mg content (wt. %)=Magnesium oxide content (wt. %)×[(Atomic weight of magnesium)/(Molecular weight of magnesium oxide]

3) Determination of $CO_2$ Content

The $CO_2$ content is determined according to JIS-R-9011 (1933) "Chemical Analysis of Lime, 6.11 (Quantitative Analysis of Carbon Dioxide)"

4) Determination of OH Content

Each of the contained water, ignition loss and whole carbon dioxide content is determined, and the OH content is calculated by the following equation:

OH content (wt. %)=[Ignition loss (wt. %)−Amount of contained water (wt. %)−Whole carbon dioxide content (wt. %)]×[(Molecular weight of OH)/(Molecular weight of water)]

The contained water, ignition loss and whole carbon dioxide content are determined in the following manners:

Amount of contained water (wt. %): determined by means of a Kett moisture content meter.

Ignition loss (wt. %): determined according to JIS-R-9011 (1933) "Chemical Analysis of Lime, 6.1 (Quantitative Analysis of Ignition Loss)".

Amount of whole carbon dioxide (wt. %): determined by means of CARBON/SULFUR-ANALYZER EMIA-820 (available from Horiba Seisakusho Co., Ltd.). The sample is heated to 1250° C. in an oxygen stream, and the amounts of the produced carbon dioxide and the produced carbon monoxide are determined using an IR spectrum. The amount of whole carbon dioxide corresponds to a total of the measured carbon dioxide amount and an amount converted from the measured carbon monoxide amount.

5) Measurement of BET Specific Surface Area

A sample in an amount of 0.2 to 0.3 g is measured according to the BET 5-points measurement method using an automatic gas adsorption-measuring apparatus (AUTOSORB-3B, available from Quantachrome Co., Ltd.). If the water contained in the sample is 0.2 wt. % or more, the sample is dried at 200° C. for one hour by degassing by means of a vacuum pump.

6) Determination of Resistance to Deformation Under Load

The resistance is measured by means of a Kiya hardness meter. In more detail, the load is applied in a direction in parallel with the bottom surface of the calcined product (cylindrical granular product), and the weight of load at which the calcined product is broken down is detected. 50 calcined products are subjected to the measurement, and the average value of the weight of load is marked as the resistance to deformation under load.

TABLE 2-3

| Calcined product | Ca content (wt. %) | Mg content (wt. %) | Mg/(Ca + Mg) (wt.) | $CO_2$ content (wt. %) | OH content (wt. %) |
|---|---|---|---|---|---|
| No. 2-1 | 55.61 | 0.25 | 0.004 | 2.03 | 17.8 |
| No. 2-2 | 50.26 | 4.69 | 0.085 | 2.51 | 17.5 |
| No. 2-3 | 42.80 | 11.63 | 0.214 | 2.04 | 17.0 |
| No. 2-4 | 29.61 | 24.08 | 0.449 | 2.00 | 14.4 |
| No. 2-5 | 15.45 | 38.35 | 0.713 | 2.44 | 10.3 |
| No. 2-6 | 3.72 | 50.62 | 0.932 | 2.08 | 6.5 |
| No. 2-7 | 0.73 | 53.75 | 0.987 | 1.04 | 7.4 |
| No. 2-8 | 67.47 | 0.13 | 0.002 | 2.01 | 1.6 |
| No. 2-9 | 60.93 | 5.44 | 0.082 | 2.31 | 2.0 |
| No. 2-10 | 51.10 | 13.37 | 0.207 | 1.78 | 2.0 |
| No. 2-11 | 34.13 | 27.02 | 0.442 | 2.58 | 2.9 |
| No. 2-12 | 17.54 | 40.25 | 0.696 | 2.27 | 4.1 |
| No. 2-13 | 3.91 | 51.45 | 0.929 | 2.11 | 5.0 |
| No. 2-14 | 0.32 | 55.34 | 0.994 | 0.83 | 5.4 |
| No. 2-15 | 70.71 | 0.32 | 0.005 | ≦0.1 | ≦0.1 |
| No. 2-16 | 63.74 | 5.95 | 0.085 | ≦0.1 | ≦0.1 |
| No. 2-17 | 53.88 | 14.64 | 0.214 | ≦0.1 | ≦0.1 |
| No. 2-18 | 36.04 | 29.31 | 0.449 | ≦0.1 | ≦0.1 |
| No. 2-19 | 17.87 | 44.35 | 0.713 | ≦0.1 | ≦0.1 |
| No. 2-20 | 4.11 | 55.95 | 0.932 | ≦0.1 | ≦0.1 |
| No. 2-21 | 0.80 | 59.00 | 0.987 | ≦0.1 | ≦0.1 |

Remarks: Calcined products No. 2-1, No. 2-6 through No. 2-8, No. 2-13 through No 2-21 are products for reference. Other calcined products embody the disclosed invention.

TABLE 2-4

| Calcined product | BET specific surface area ($m^2/g$) | Resistance to deformation under load |
|---|---|---|
| No. 2-1 | 43.5 | 26.2 N |
| No. 2-2 | 63.6 | 27.9 N |
| No. 2-3 | 98.3 | 32.0 N |
| No. 2-4 | 151.5 | 24.9 N |
| No. 2-5 | 220.9 | 9.8 N |
| No. 2-6 | 276.4 | 0.1 N |
| No. 2-7 | 282.0 | <0.1 N |
| No. 2-8 | 88.2 | 3.0 N |
| No. 2-9 | 110.3 | 7.1 N |
| No. 2-10 | 143.5 | 8.2 N |
| No. 2-11 | 214.5 | 11.9 N |
| No. 2-12 | 261.2 | 8.9 N |
| No. 2-13 | 299.5 | 0.5 N |
| No. 2-14 | 333.4 | 0.5 N |
| No. 2-15 | 3.8 | 14.2 N |
| No. 2-16 | 4.2 | 10.0 N |
| No. 2-17 | 4.6 | 7.6 N |
| No. 2-18 | 6.1 | 2.7 N |
| No. 2-19 | 7.6 | 1.3 N |
| No. 2-20 | 9.4 | 0.5 N |
| No. 2-21 | 6.7 | 0.5 N |

Remarks: Calcined products No. 2-1, No. 2-6 through No. 2-8, No. 2-13 through No 2-21 are products for reference. Other calcined products embody the disclosed invention.

FIG. 2 is a graph indicating a relationship between Mg/(Ca+Mg) of the calcined products No. 2-1 to No. 2-7 and a BET specific surface area thereof or a resistance thereof to deformation under load. FIG. 3 is a graph indicating a relationship between Mg/(Ca+Mg) of the calcined products No. 2-8 to No. 2-14 and a BET specific surface area thereof or a resistance thereof to deformation under load. FIG. 4 is a graph indicating a relationship between Mg/(Ca+Mg) of the calcined products No. 2-15 to No. 2-21 and a BET specific surface area thereof or a resistance thereof to deformation under load.

From the results illustrated in FIG. 2 to FIG. 4, it is understood that the calcined granular materials of No. 2-1 through No. 2-14 which are produced by calcining the powder mixture granules under reduced pressure have larger BET specific surface area and higher resistance to deformation under load than the calcined granular materials of No. 2-15 through No. 2-21 which are produced by calcining the powder mixture granules under atmospheric pressure. Further, the calcined granular materials of No. 2-2 to No. 2-5 and No. 2-9 to No. 2-12 which have Mg/(Ca+Mg) in the range of 0.05 to 0.80 have larger BET specific surface area than the calcined granular materials of No. 2-1 through No. 2-8 which have Mg/(Ca+Mg) of not more than 0.05 and have higher resistance to deformation under load than the calcined granular materials of Nos. 2-6, 2-7, 2-13, and 2-14 which have Mg/(Ca+Mg) of more than 0.80.

Example 3

Desorption isothermal curves were obtained on the below-described samples (1) to (3) by a nitrogen gas adsorption method by means of an automatic gas adsorption measuring apparatus (AUTOSORB-3B). From the obtained desorption isothermal curves, the micropore size distribution curves Ds (log d), micropore specific surface area distribution curves and micropore volume distribution curves in relation to the specific surface areas were obtained by the BJH method. The procedure of obtaining the isothermal adsorption curve was performed using a sample in an amount of 0.1 to 0.2 g. When the sample contains water of 0.2 wt. % or more, the sample was predried at 200° C. for 1 hr., under degassing by the use of a vacuum pump.

(1) Calcined product No. 1-3 produced in Example 1
(2) Calcined product No. 1-5 produced in Example 1
(3) Porous calcium hydroxide granules produced in Example 1 (which was employed for the productions of the calcined products No. 1-3 and No. 1-5.)

FIG. 5 is a graph indicating a micropore size distribution curve Ds (log d) in relation to the specific surface area according to the BJH method. From the results illustrated in FIG. 5, it is understood that the calcined products No. 1-3 and No. 1-5 according to the invention show higher micropore specific surface area for the micropore having a pore size of 2 to 9 nm than the porous calcium hydroxide granules from which the calcined products were produced.

FIG. 6 is a graph indicating a micropore specific surface area distribution curve obtained by the BJH method. FIG. 7 is a graph indicating a micropore volume distribution curve obtained by the BJH method. The specific surface area of whole micropores having a pore size of 2 to 9 nm and the volume of whole micropores having a pore size of 10 to 100 nm, both of which are obtained from the results illustrated in FIG. 6 and FIG. 7, are set forth in the following Table 3.

TABLE 3

| Sample | Specific surface area of whole micropores (pore size: 2-9 nm) | Volume of whole micropores (pore size: 10-100 nm) |
|---|---|---|
| Calcined product | | |
| No. 1-3 | 36.8 $m^2/g$ | 0.381 mL/g |
| No. 1-5 | 52.4 $m^2/g$ | 0.436 mL/g |
| Porous Ca(OH)2 | | |
| granules | 13.6 $m^2/g$ | 0.285 mL/g |

Example 4

The micropore size distribution curves Ds (log d), micropore specific surface area distribution curves and micropore volume distribution curves in relation to the specific surface areas were obtained on the following samples (1) to (4) in the same manner described in Example 3 by the BJH method.

(1) Calcined product No. 2-3 produced in Example 2 (which was produced by calcining Powder mixture granules C at 350° C. under reduced pressure)

(2) Calcined product No. 2-10 produced in Example 2 (which was produced by calcining Powder mixture granules C at 400° C. under reduced pressure)

(3) Calcined product No. 2-17 produced in Example 2 (which was produced by calcining Powder mixture granules C at 1000° C. under reduced pressure)

(4) Powder mixture granules C produced in Example 2

FIG. 8 is a graph indicating a micropore size distribution curve Ds (log d) in relation to the specific surface area which was obtained by to the BJH method. From the results illustrated in FIG. 8, it is understood that the calcined products No. 2-3 and No. 2-10 according to the invention have larger micropore specific surface area in both of micropores of 2-9 nm and micropores of less than 2 nm than the granules C from which the calcined products were produced. Further, the calcined product No. 2-17 which was produced by calcining the granules C at 1000° C. under atmospheric pressure have, as a whole, smaller micropore specific surface area than the granules C from which the calcined product was produced.

FIG. 9 is a graph indicating a micropore specific surface area distribution curve which was obtained by the BJH method. FIG. 10 is a graph indicating a micropore volume distribution curve which was obtained by the BJH method. The specific surface area of whole micropores having a pore size of less than 2 nm, the specific surface area of whole micropores having a pore size of 2 to 9 nm and the specific surface area of whole micropores having a pore size of 10 to 100 nm, all of which are obtained from the results illustrated in FIG. 9 and FIG. 10, are set forth in the following Table 4.

TABLE 4

| Sample | Specific surface area of whole micropores | | Volume of whole micropores |
|---|---|---|---|
| | (pore size: <2 nm) | (pore size: 2-9 nm) | (pore size: 10-100 nm) |
| Calcined product | | | |
| No. 2-3 | 46.9 m$^2$/g | 47.0 m$^2$/g | 0.217 mL/g |
| No. 2-10 | 43.8 m$^2$/g | 103.2 m$^2$/g | 0.319 mL/g |
| No. 2-17 | 6.9 m$^2$/g | 10.9 m$^2$/g | 0.013 mL/g |
| Granules C | 8.5 m$^2$/g | 25.1 m$^2$/g | 0.201 mL/g |

Example 5

The micropore size distribution curves Ds (log d), micropore specific surface area distribution curves and micropore volume distribution curves in relation to the specific surface areas were obtained on the following samples (1) to (4) in the same manner described in Example 3 by the BJH method.

(1) Calcined product No. 2-5 produced in Example 2 (which was produced by calcining Powder mixture granules E at 350° C. under reduced pressure)

(2) Calcined product No. 2-12 produced in Example 2 (which was produced by calcining Powder mixture granules E at 400° C. under reduced pressure)

(3) Calcined product No. 2-19 produced in Example 2 (which was produced by calcining Powder mixture granules E at 1000° C. under reduced pressure)

(4) Powder mixture granules E produced in Example 2

FIG. 11 is a graph indicating a micropore size distribution curve Ds (log d) in relation to the specific surface area which was obtained by to the BJH method. From the results illustrated in FIG. 11, it is understood that the calcined products No. 2-5 and No. 2-12 according to the invention have larger micropore specific surface area in both of micropores of 2-9 nm and micropores of less than 2 nm than the granules E from which the calcined products were produced. Further, the calcined product No. 2-19 which was produced by calcining the granules C at 1000° C. under atmospheric pressure have, as a whole, smaller micropore specific surface area than the granules E from which the calcined product was produced.

FIG. 12 is a graph indicating a micropore specific surface area distribution curve which was obtained by the BJH method. FIG. 13 is a graph indicating a micropore volume distribution curve which was obtained by the BJH method. The specific surface area of whole micropores having a pore size of less than 2 nm, the specific surface area of whole micropores having a pore size of 2 to 9 nm and the specific surface area of whole micropores having a pore size of 10 to 100 nm, all of which are obtained from the results illustrated in FIG. 12 and FIG. 13, are set forth in the following Table 5.

TABLE 5

| Sample | Specific surface area of whole micropores | | Volume of whole micropores |
|---|---|---|---|
| | (pore size: <2 nm) | (pore size: 2-9 nm) | (pore size: 10-100 nm) |
| Calcined product | | | |
| No. 2-5 | 134.7 m$^2$/g | 98.9 m$^2$/g | 0.184 mL/g |
| No. 2-12 | 158.0 m$^2$/g | 123.0 m$^2$/g | 0.205 mL/g |
| No. 2-19 | 4.5 m$^2$/g | 10.1 m$^2$/g | 0.018 mL/g |
| Granules E | 4.6 m$^2$/g | 31.5 m$^2$/g | 0.135 mL/g |

Figure 1:
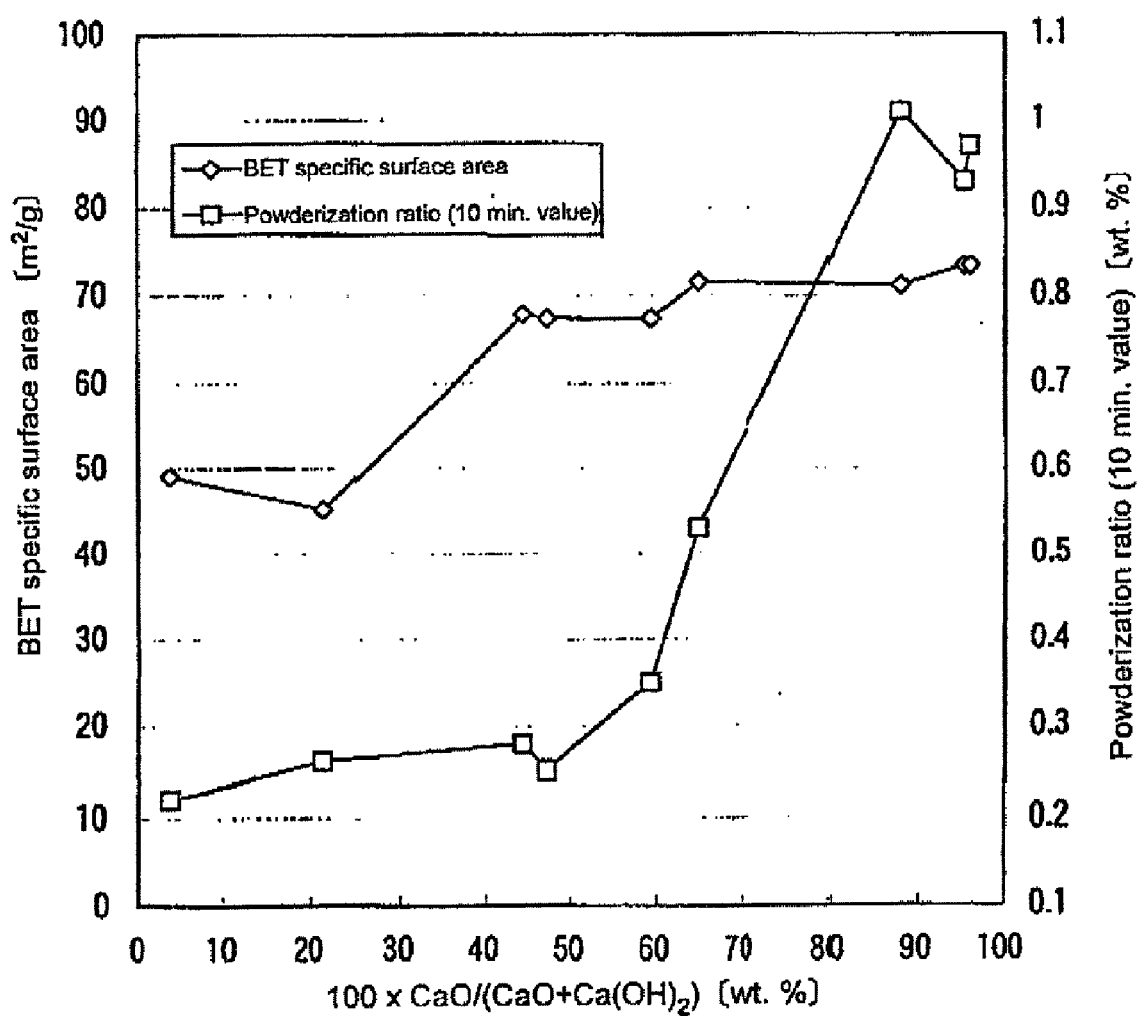
FIG. 1 is a graph indicating a relationship between a ratio of the amount of calcium oxide to a total of the amount of calcium oxide and the amount of calcium hydroxide or a calcined product thereof which were produced in Example 1 and a BET specific surface area thereof or a powderization ratio (value at a lapse of 10 min.) thereof.
Figure 2:
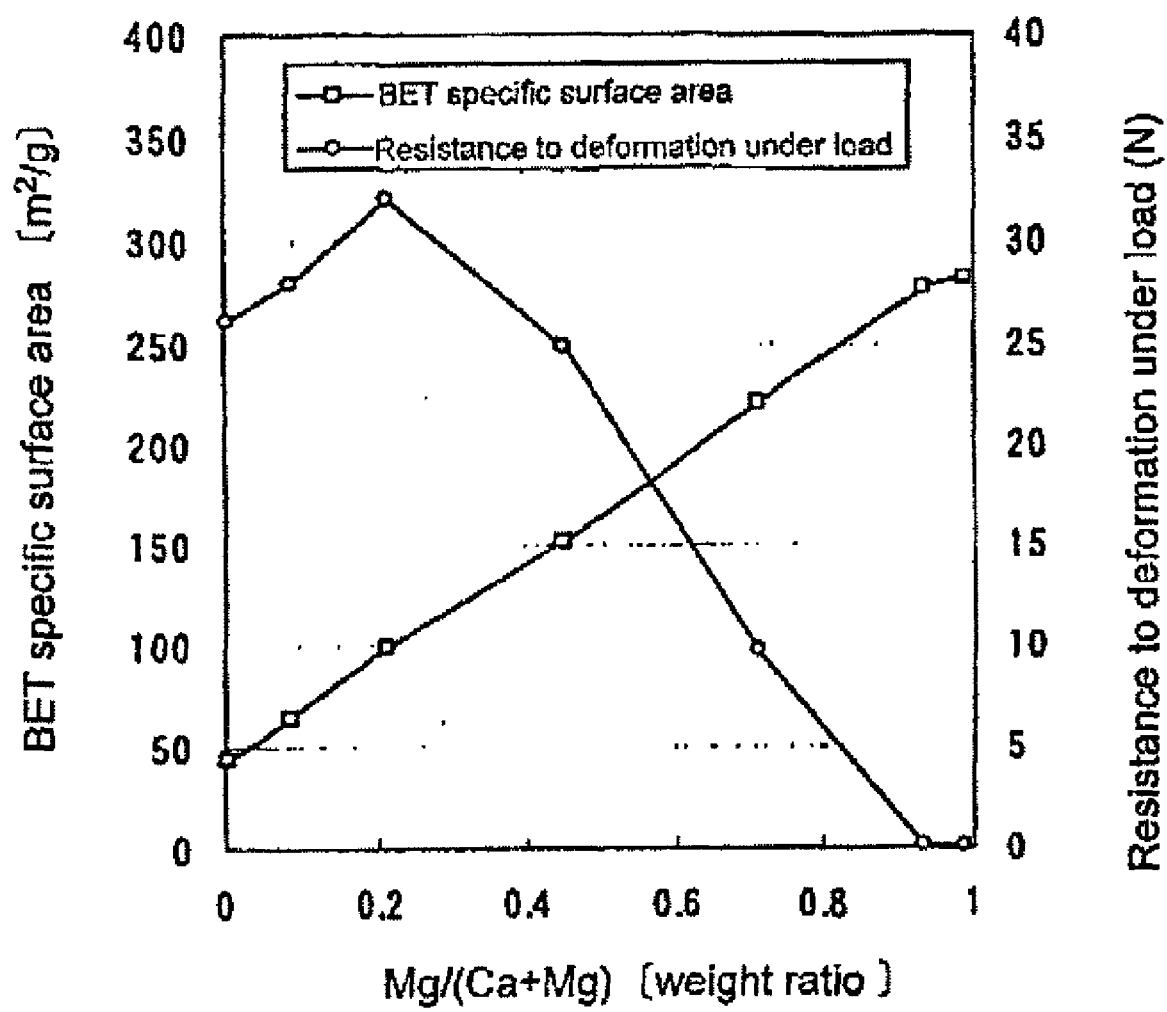
FIG. 2 is a graph indicating a relationship between Mg/(Ca+Mg) of the calcined products No. 2-1 to No. 2-7 which were produced in Example 2 and a BET specific surface area thereof or a resistance thereof to deformation under load.
Figure 3:
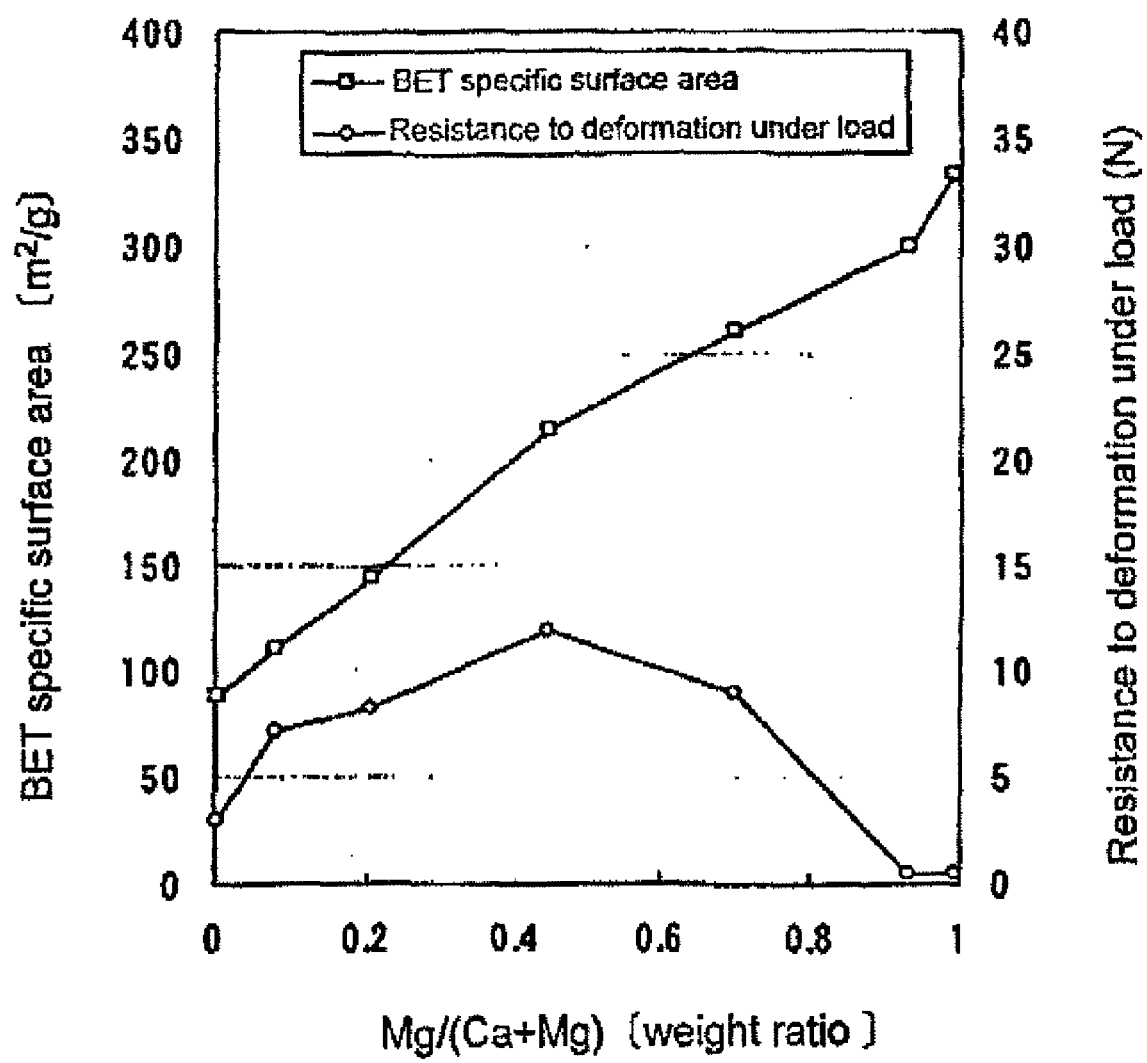
FIG. 3 is a graph indicating a relationship between Mg/(Ca+Mg) of the calcined products No. 2-8 to No. 2-14 which were produced in Example 2 and a BET specific surface area thereof or a resistance thereof to deformation under load.
Figure 4:
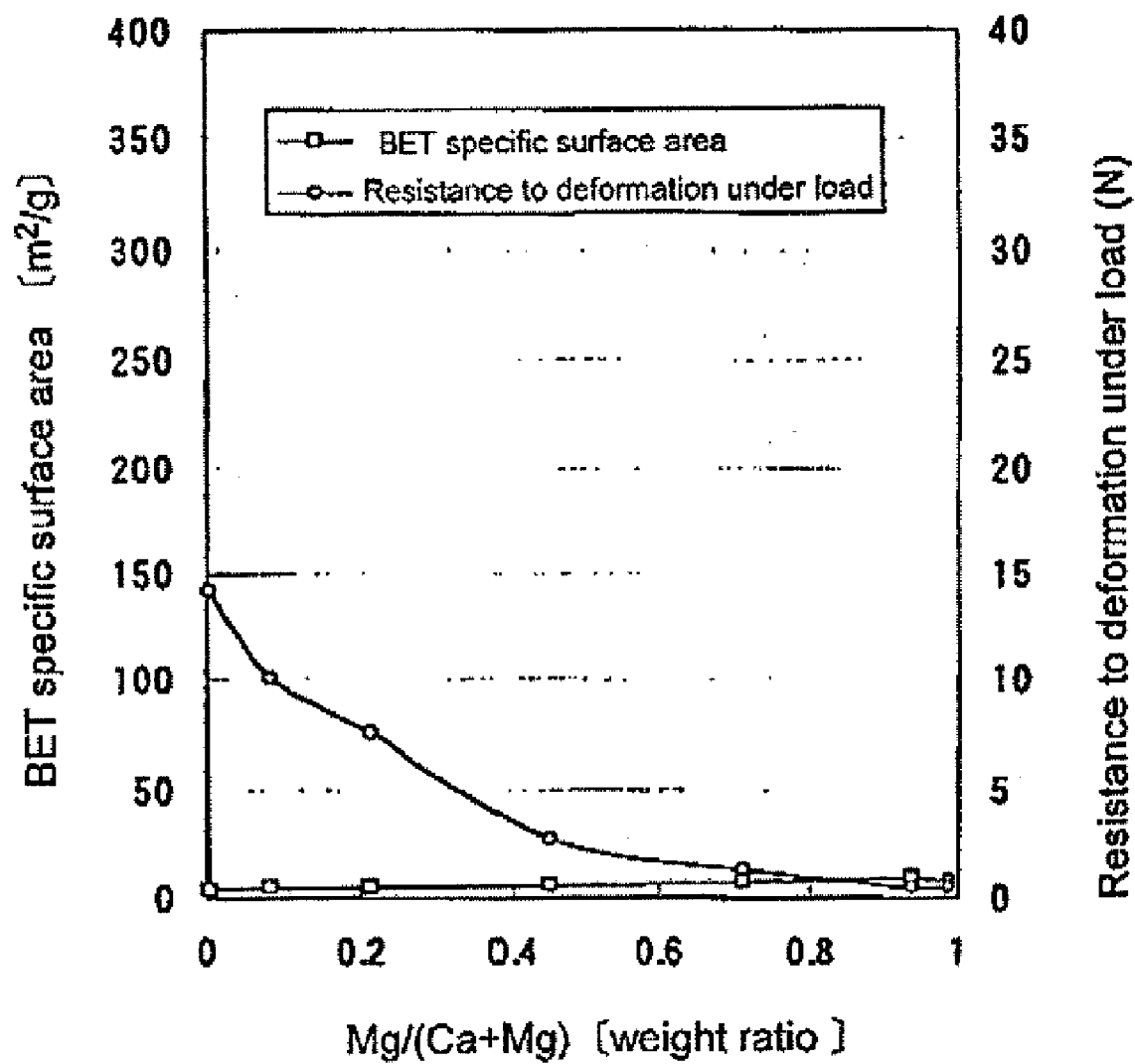
FIG. 4 is a graph indicating a relationship between Mg/(Ca+Mg) of the calcined products No. 2-15 to No. 2-21 which were produced in Example 2 and a BET specific surface area thereof or a resistance thereof to deformation under load.
Figure 5:
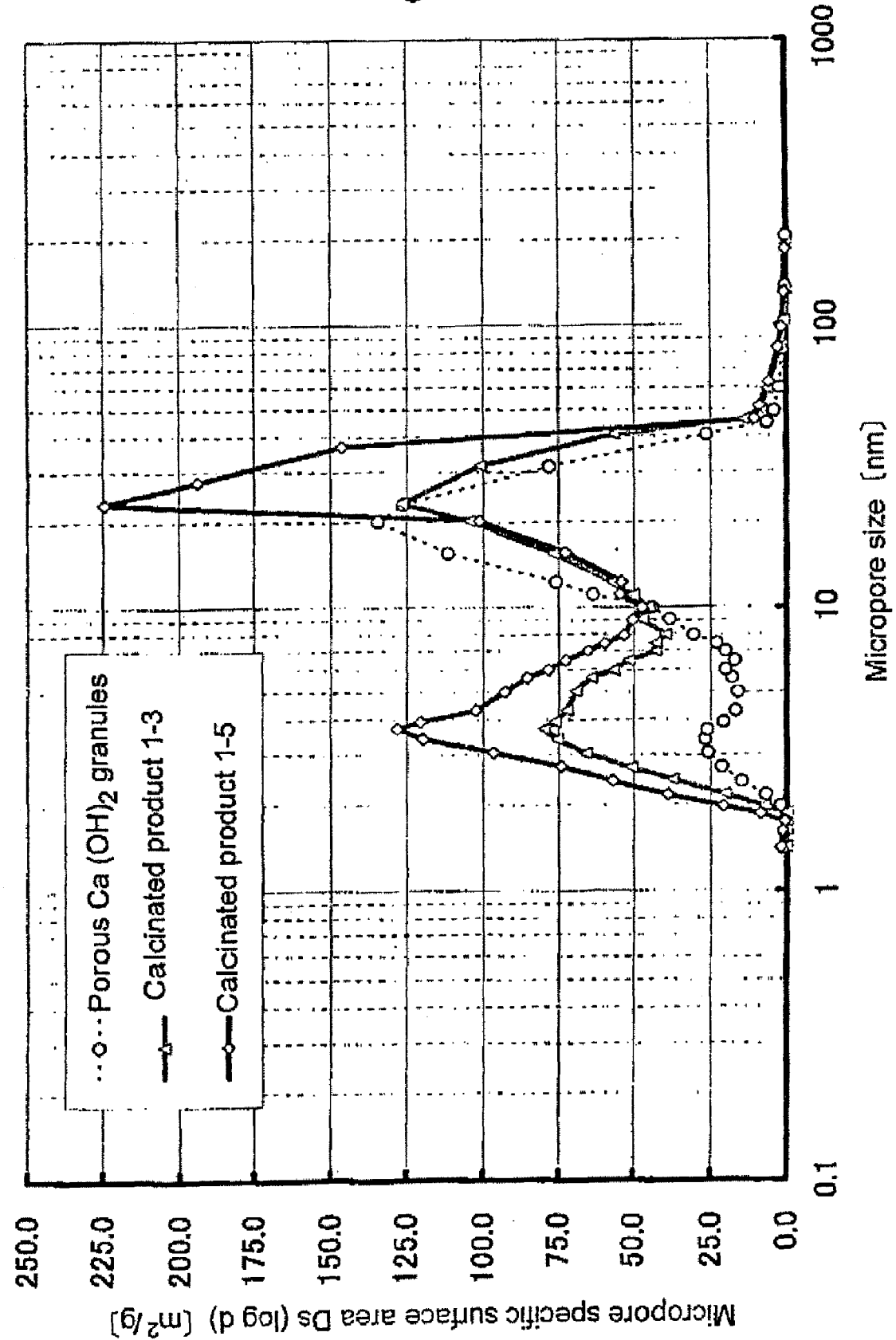
FIG. 5 is a graph indicating a micropore size distribution curve Ds (log d) in relation to the specific surface area which was obtained in Example 3 according to the BJH method.
Figure 6:
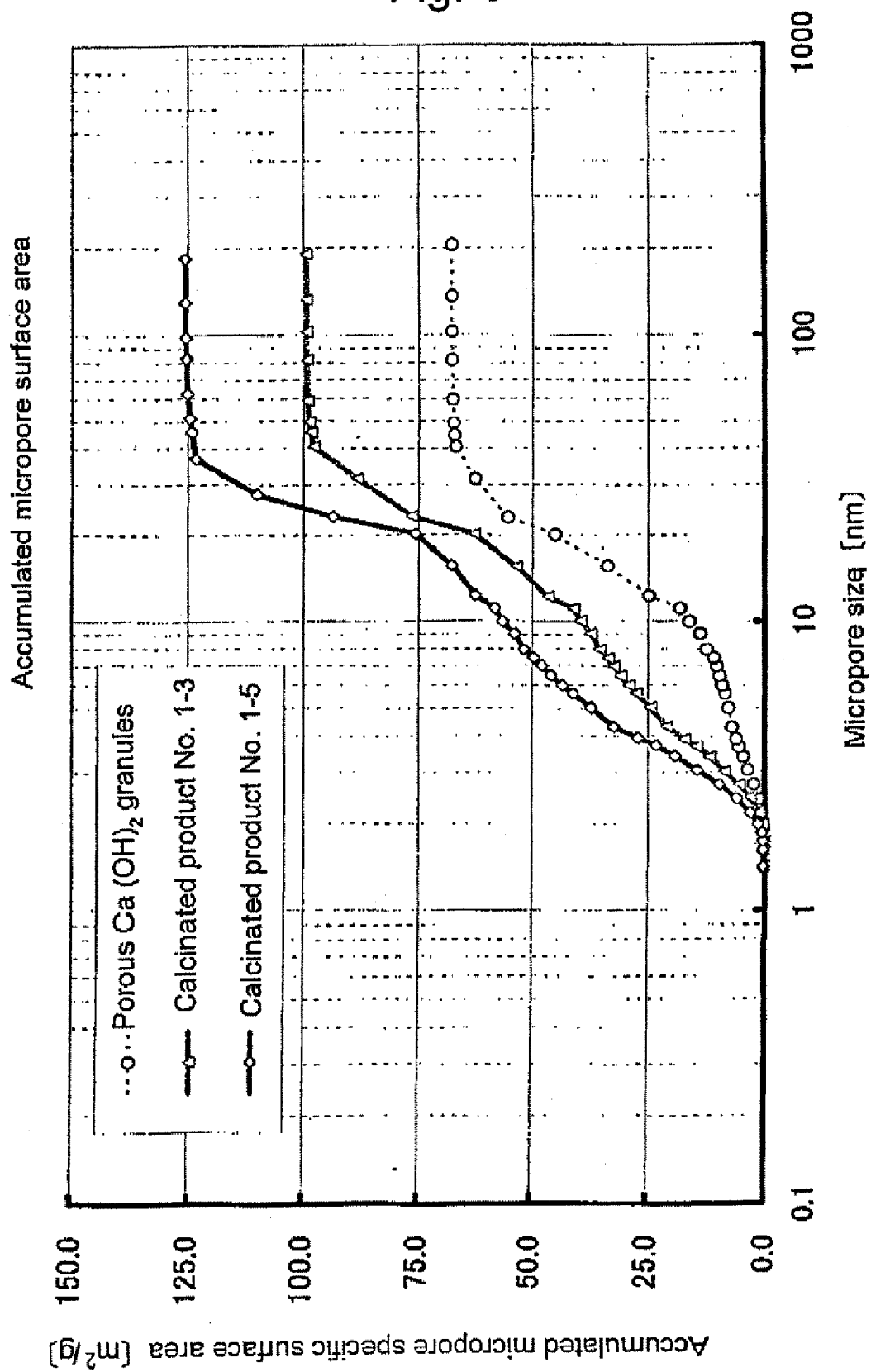
FIG. 6 is a graph indicating a micropore specific surface area distribution curve which was obtained in Example 3 according to the BJH method.
Figure 7:
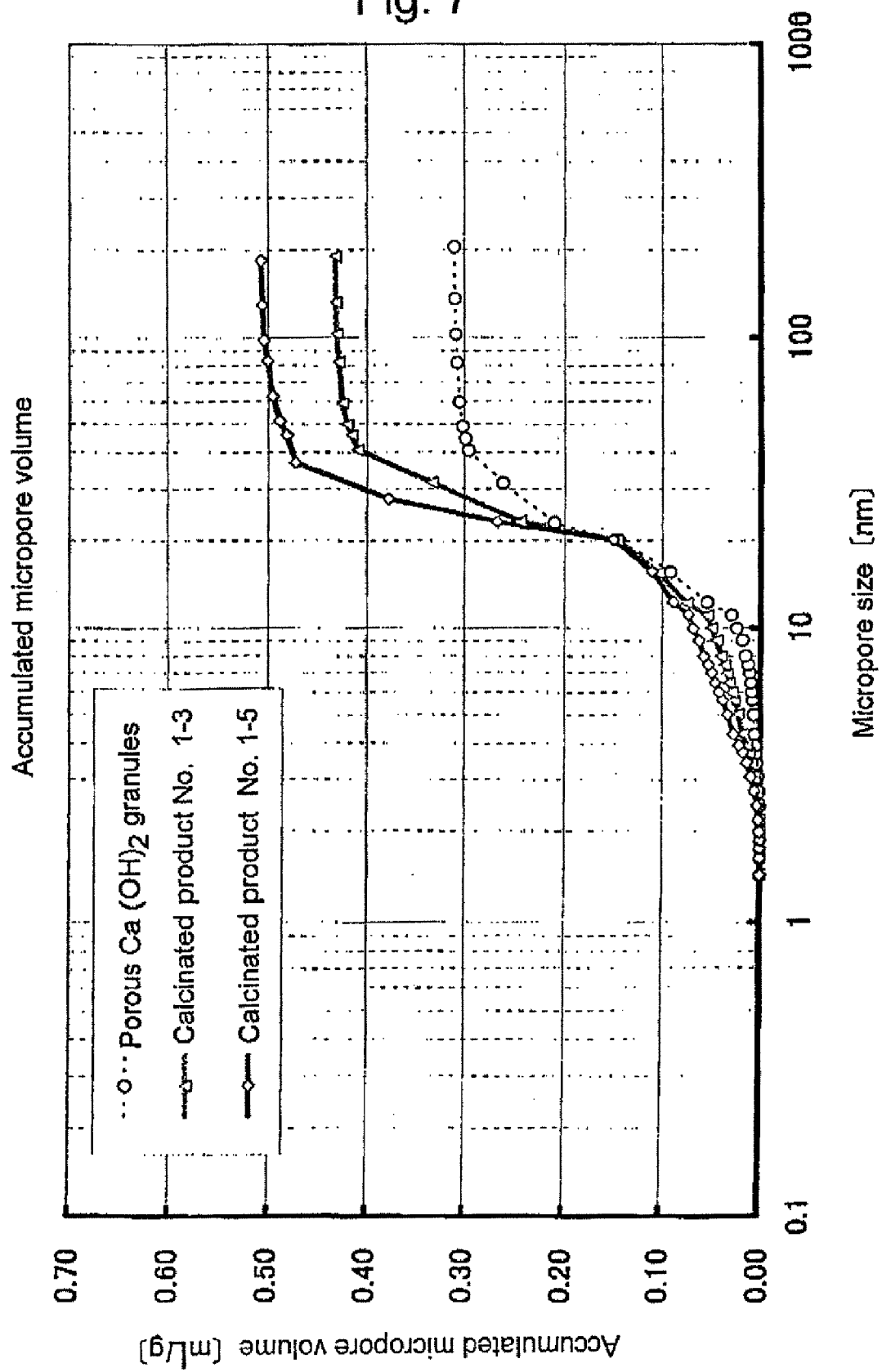
FIG. 7 is a graph indicating a micropore volume distribution curve which was obtained in Example 3 according to the BJH method.
Figure 8:
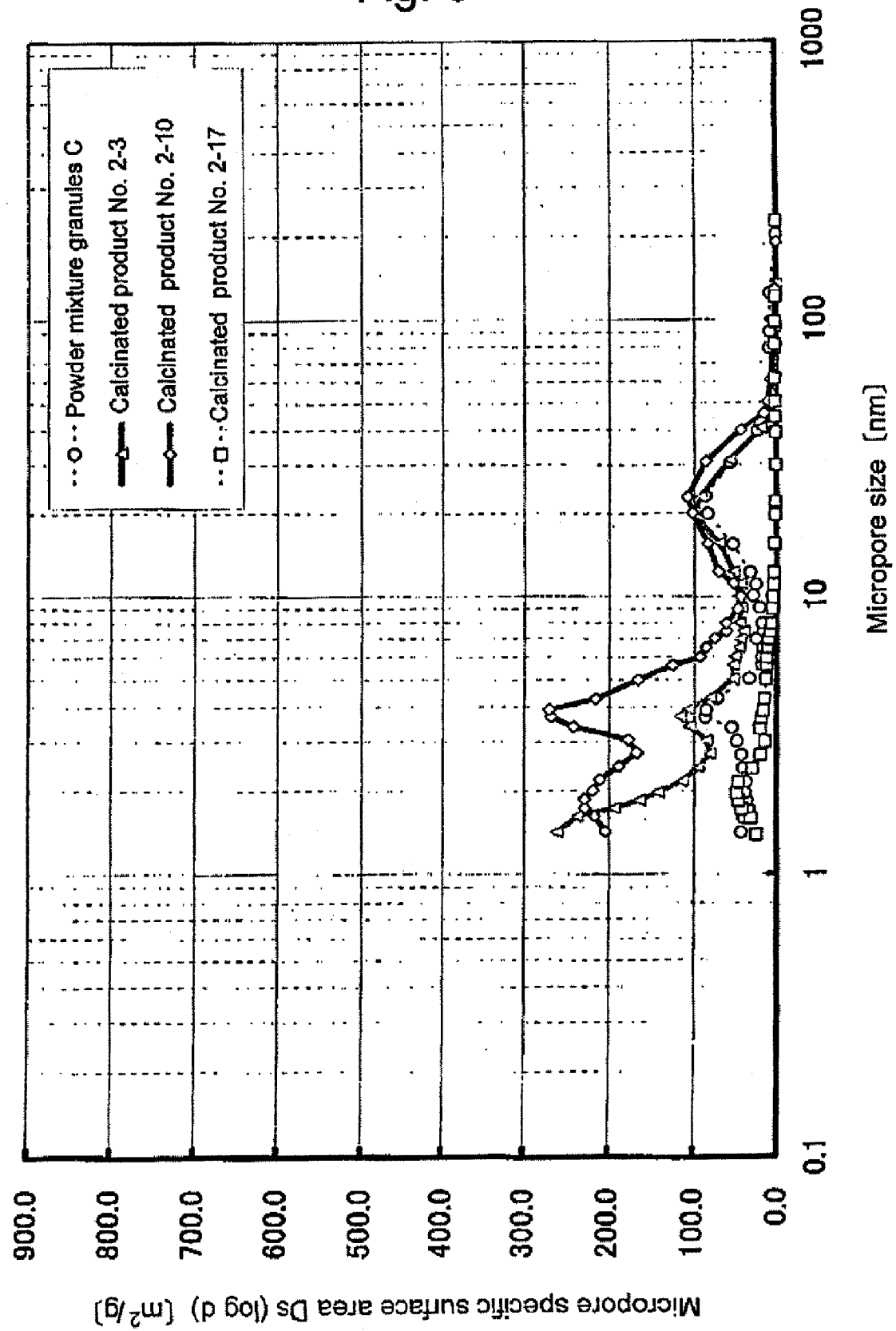
FIG. 8 is a graph indicating a micropore size distribution curve Ds (log d) in relation to the specific surface area which was obtained in Example 4 according to the BJH method.
Figure 9:
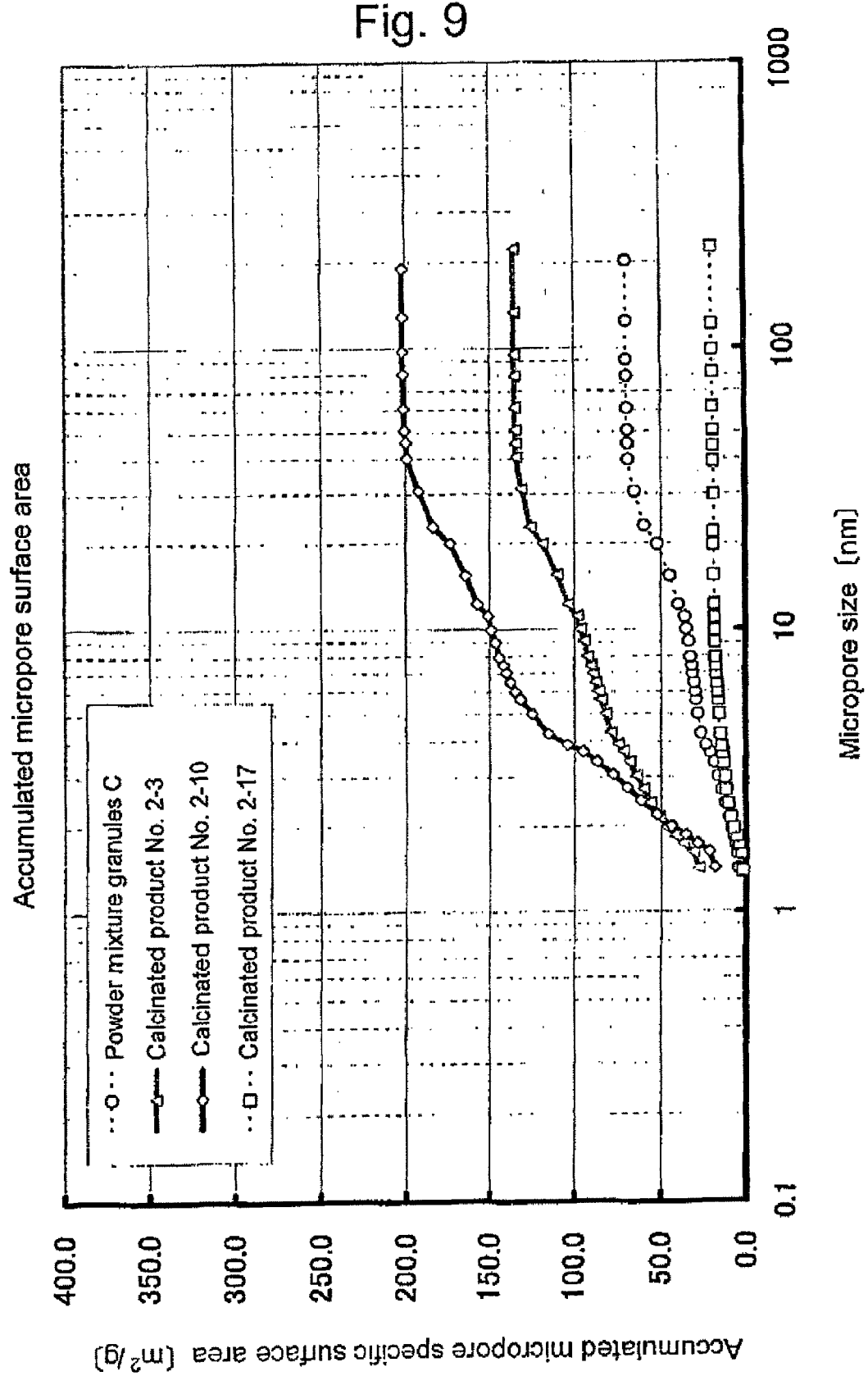
FIG. 9 is a graph indicating a micropore specific surface area distribution curve which was obtained in Example 4 according to the BJH method.
Figure 10:
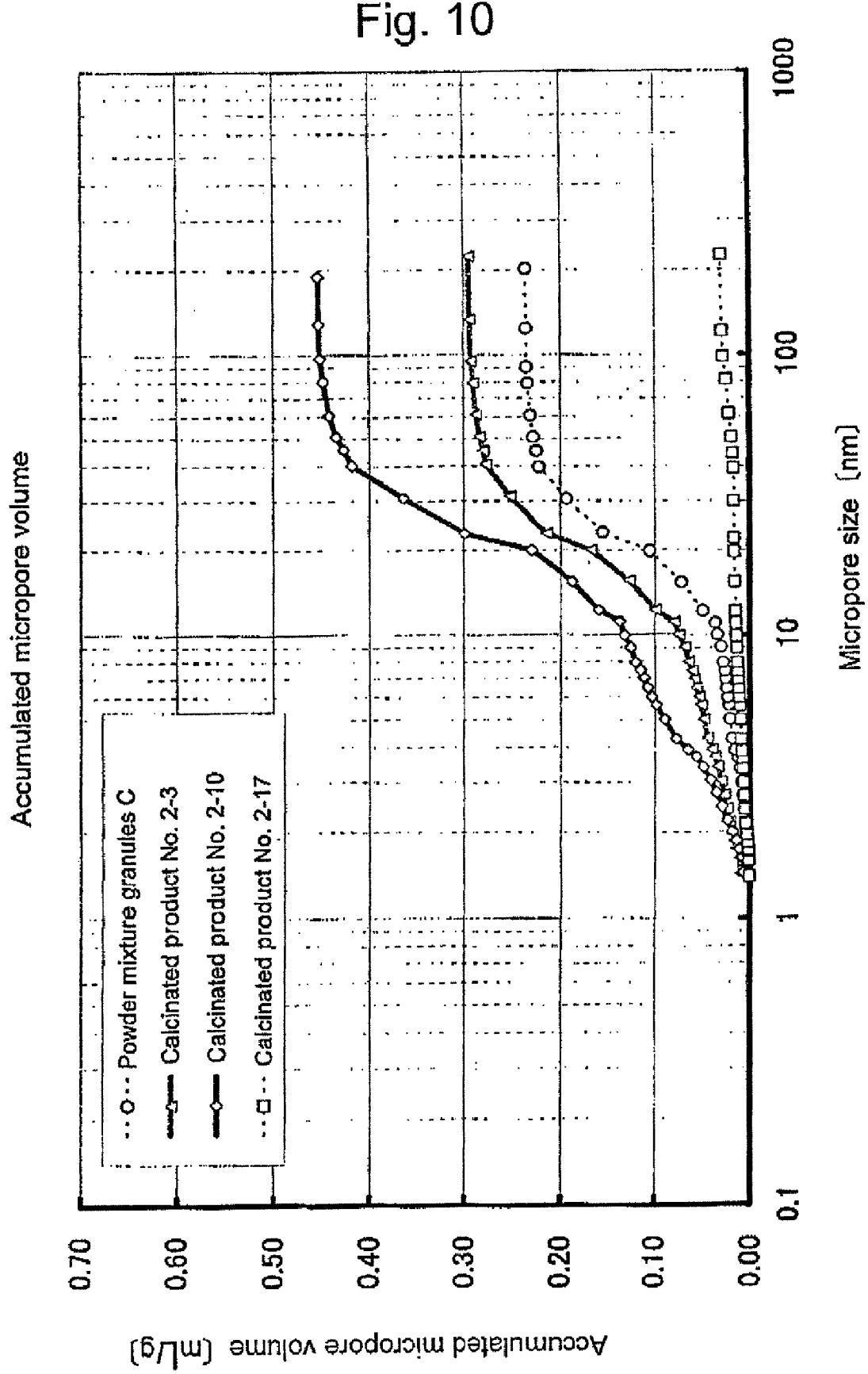
FIG. 10 is a graph indicating a micropore volume distribution curve which was obtained in Example 4 according to the BJH method.
Figure 11:
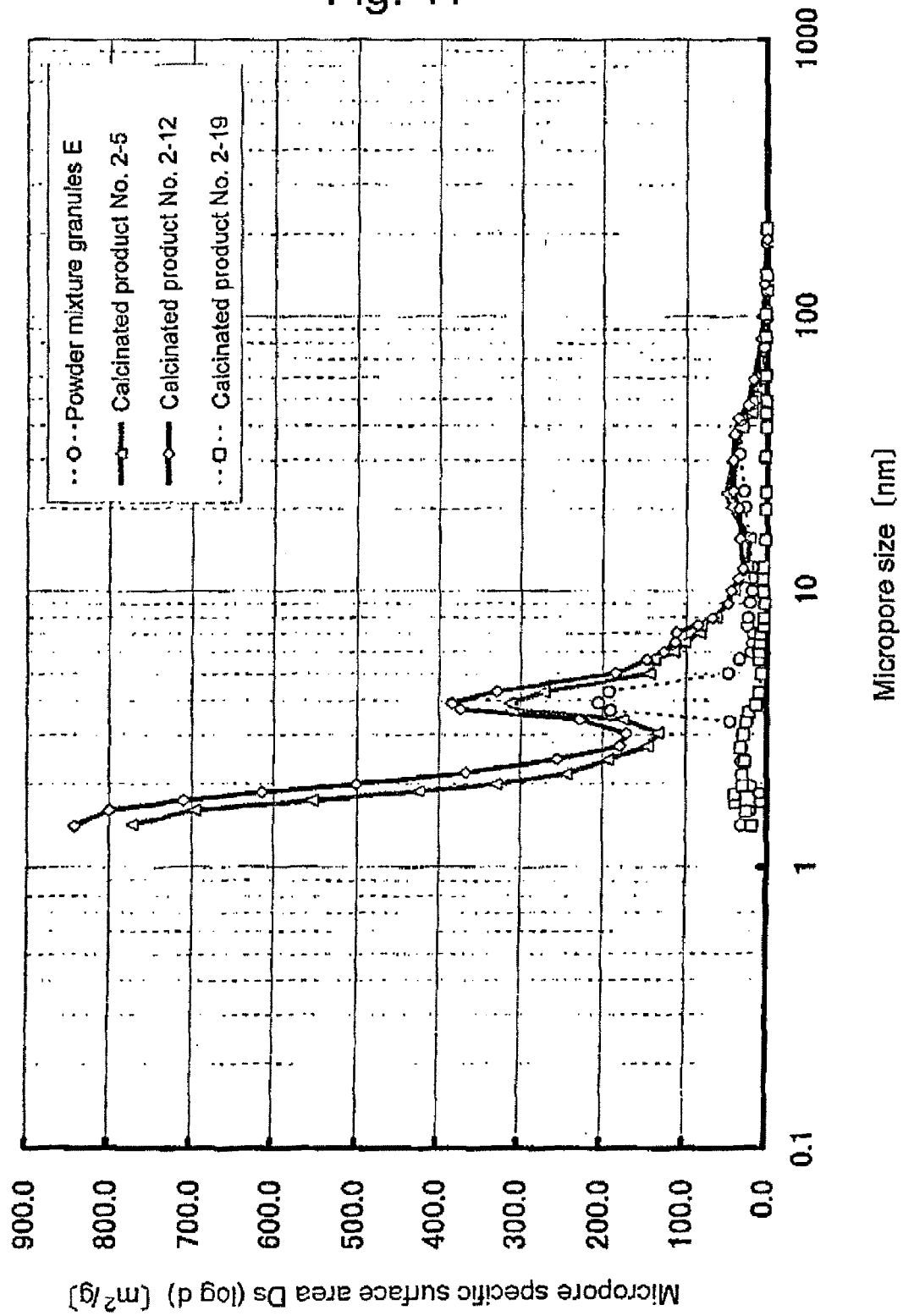
FIG. 11 is a graph indicating a micropore size distribution curve Ds (log d) in relation to the specific surface area which was obtained in Example 5 according to the BJH method.
Figure 12:
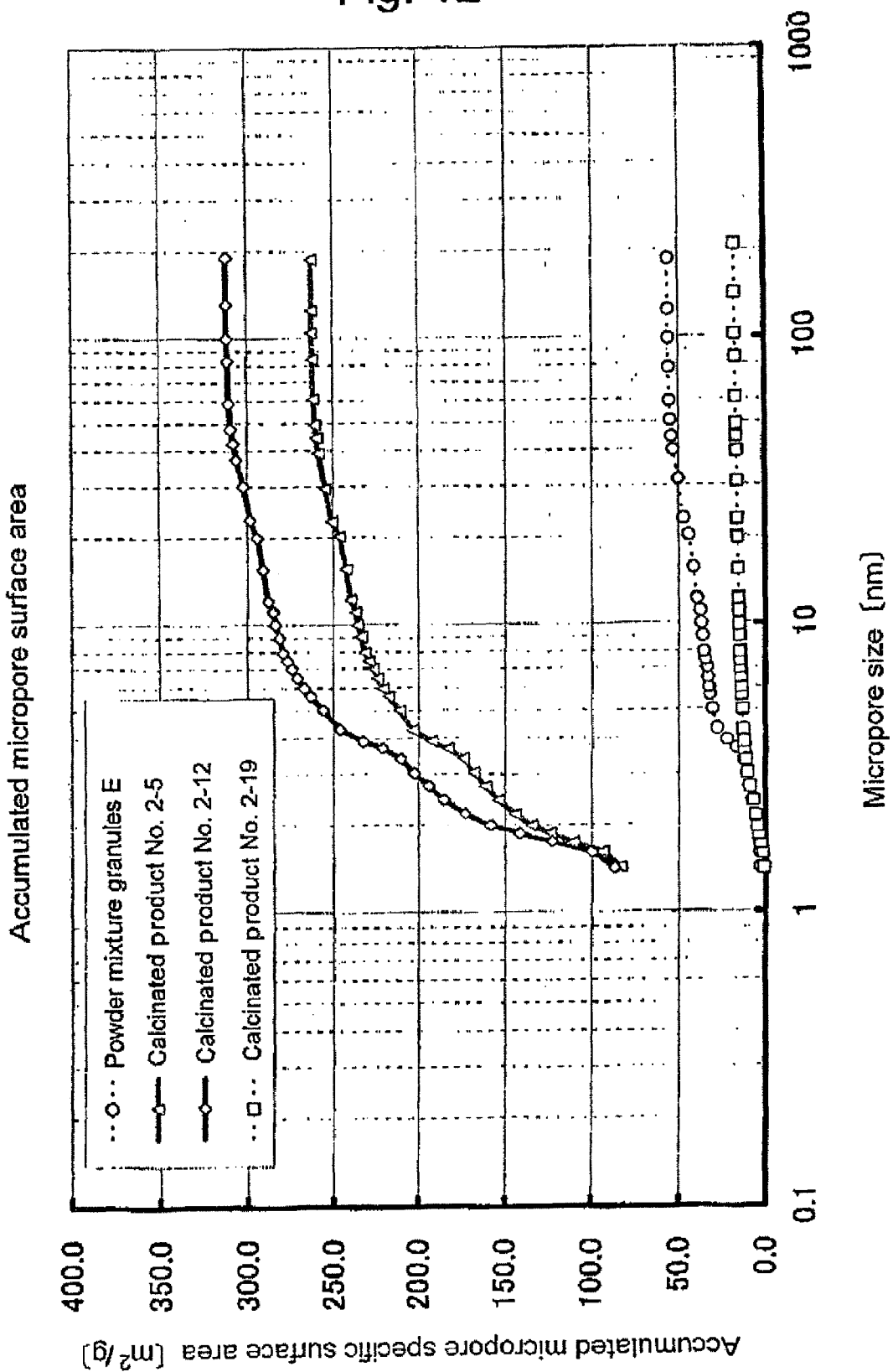
FIG. 12 is a graph indicating a micropore specific surface area distribution curve which was obtained in Example 5 according to the BJH method.
Figure 13:
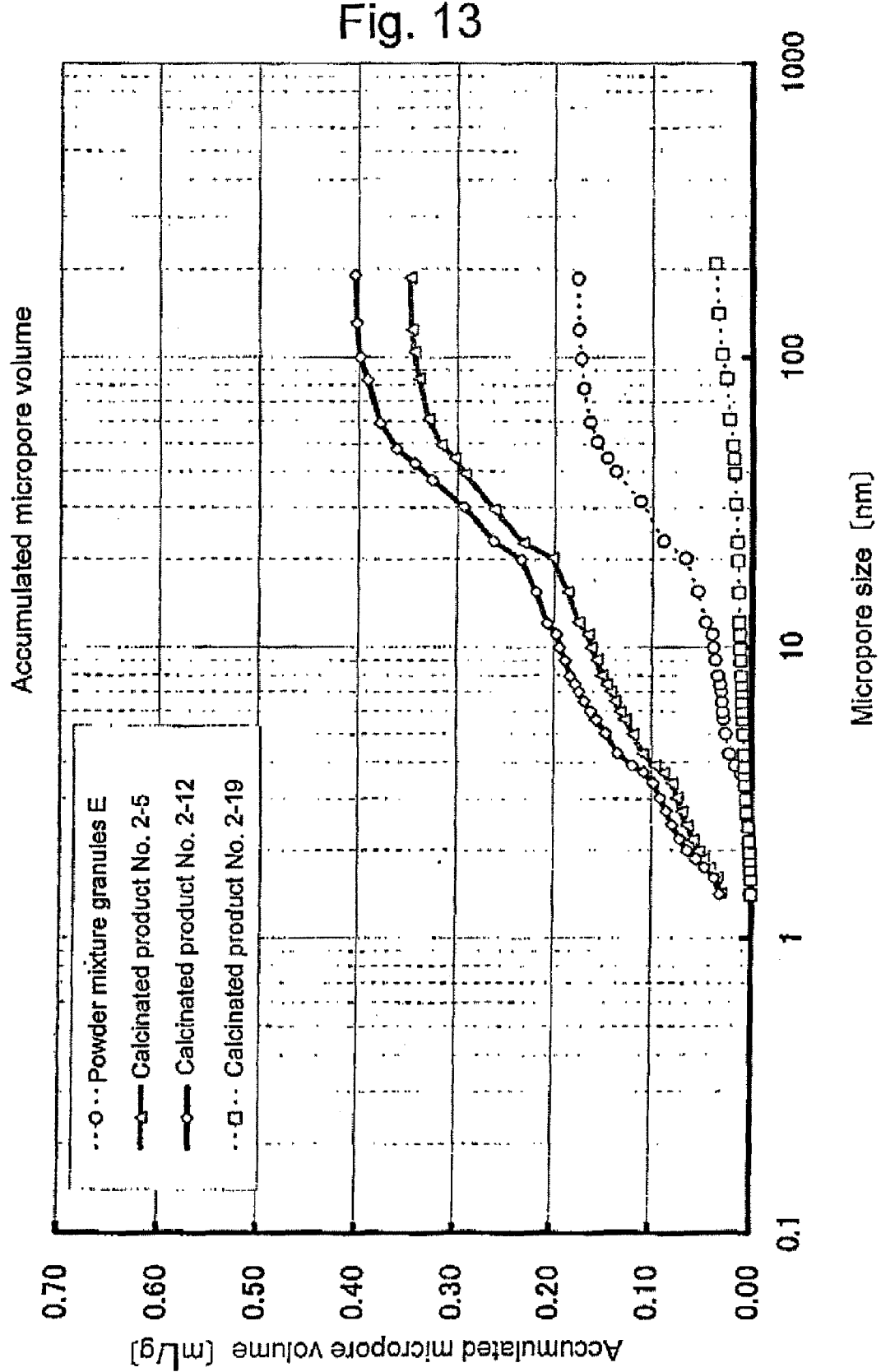
FIG. 13 is a graph indicating a micropore volume distribution curve which was obtained in Example 5 according to the BJH method.

What is claimed is:

1. A granular material comprising porous particles comprising calcium oxide and calcium hydroxide wherein the calcium oxide is contained in an amount of 30 to 80 weight % based on a total of an amount of the calcium oxide and an amount of the calcium hydroxide, and having a BET specific surface area of 40 $m^2/g$ or more, and wherein the granular material contains particles having particle sizes of 1 mm or less in an amount of less than 5 weight % and which contains particles having particle sizes of 10 mm or more in an amount of less than 5 weight %.

2. The granular material of claim 1, which has a specific surface area in the range of 20 to 100 $m^2/g$ for whole pores having pore diameters of 2 to 9 nm, the specific surface area being determined by BJH method.

3. The granular material of claim 1, which has a specific surface area in the range of 20 to 100 $m^2/g$ for whole pores having particle sizes pore diameters of 2 to 9 nm and a volume in the range of 0.1 to 0.6 mL/g for whole pores having particle sizes pore diameters of 10 to 100 nm, the specific surface area being determined by BJH method.

4. The granular material of claim 1, wherein the total of the amount of calcium oxide and the amount of calcium hydroxide is 85 weight % or more, based on an amount of the granular material.

5. A moisture adsorbing material comprising a granular material of claim 1.

6. A material for adsorbing a acidic gas which comprises a granular material of claim 1.

7. A material for adsorbing a decomposition product of a halogenated hydrocarbon gas which comprises a granular material of claim 1.

8. A material for decomposing and processing a fluorocarbon gas which comprises a catalyst for decomposing a fluorocarbon gas and a granular material of claim 1.

9. A method for producing a granular material of claim 1 which comprises calcining a granular material comprising porous calcium hydroxide particles having a BET specific surface area of 10 $m^2/g$ or more at a temperature of 315 to 500° C. and a pressure of 300 Pa or less, until an amount of the porous particles decreases by 8.8-20 weight % based on an amount of the calcium hydroxide of the latter granular material.

10. A granular material comprising porous particles comprising calcium oxide, magnesium oxide, calcium hydroxide, and magnesium hydroxide wherein a ratio of an amount of magnesium to a total of an amount of calcium and an amount of magnesium is in the range of 0.05 to 0.80, a total hydroxide content in the whole particles is in the range of 1 to 20 weight %, and having a BET specific surface area of 50 $m^2/g$ or more.

11. The granular material of claim 10, which has a specific surface area in the range of 40 to 200 $m^2/g$ for whole pores having pore diameters of 2 to 9 nm, the specific surface area being determined by BJH method.

12. The granular material of claim 10, which has a specific surface area in the range of 20 to 200 $m^2/g$ for whole pores having pore diameters of less than 2 nm, the specific surface area being determined by BJH method.

13. The granular material of claim 10, which has a specific surface area in the range of 20 to 200 $m^2/g$ for whole pores having pore diameters of less than 2 nm, a specific surface area in the range of 40 to 200 $m^2/g$ for whole pores having pore diameters in the range of 2 to 9 nm and a volume in the range of 0.1 to 0.6 mL/g for of whole pores having pore diameters in the range of 10 to 100 nm, the specific surface area being determined by BJH method.

14. The granular material of claim 10, wherein the total amount of the calcium and magnesium is 50 weight % or more, based on an amount of the granular material.

15. The granular material of claim 10, which contains particles having particle sizes of 1 mm or less in an amount of less than 5 weight % and which contains particles having particle sizes of 10 mm or more in an amount of less than 5 weight %.

16. A moisture adsorbing material comprising a granular material of claim 10.

17. A material for adsorbing a acidic gas which comprises a granular material of claim 10.

18. A material for adsorbing a decomposition product of a halogenated hydrocarbon gas which comprises a granular material of claim 10.

19. A material for decomposing and processing a fluorocarbon gas which comprises a catalyst for decomposing a fluorocarbon gas and a granular material of claim 10.

20. A method for producing a granular material of claim 10 which comprises calcining a granular material comprising a mixture of porous calcium hydroxide particles having a BET specific surface area of 10 $m^2/g$ or more and porous magnesium hydroxide particles having a BET specific surface area of 10 $m^2/g$ or more in which a ratio of an amount of magnesium to a total of an amount of calcium and an amount of magnesium is in the range of 0.05 to 0.80, at a temperature of 315 to 500° C. and a pressure of 300 Pa or less.

* * * * *